(12) United States Patent
Gehr et al.

(10) Patent No.: US 10,899,042 B2
(45) Date of Patent: Jan. 26, 2021

(54) PYROLYSIS SYSTEM AND METHOD OF RECOVERING CARBON FIBRES FROM CARBON-FIBRE-CONTAINING PLASTICS

(71) Applicant: ELG Carbon Fibre International GmbH, Duisburg (DE)

(72) Inventors: Marco Gehr, Lindlar (DE); Lee Wilcox, Duisburg (DE); Ingo Kurt Strehlke, Essen (DE); Stewart Alsop, Duisburg (DE)

(73) Assignee: ELG CARBON FIBRE INTERNATIONAL GMBH, Duisburg (DE)

( * ) Notice: Subject to any disclaimer, the term of this patent is extended or adjusted under 35 U.S.C. 154(b) by 354 days.

(21) Appl. No.: 15/886,320

(22) Filed: Feb. 1, 2018

(65) Prior Publication Data

US 2019/0039266 A1 Feb. 7, 2019

Related U.S. Application Data

(63) Continuation of application No. 14/780,840, filed as application No. PCT/EP2014/055980 on Mar. 25, 2014.

(30) Foreign Application Priority Data

Mar. 28, 2013 (EP) .................................. 13001625
Apr. 16, 2013 (EP) .................................. 13001994

(51) Int. Cl.
*B29B 17/02* (2006.01)
*F27B 7/20* (2006.01)
(Continued)

(52) U.S. Cl.
CPC .............. *B29B 17/02* (2013.01); *B09C 1/065* (2013.01); *C10B 47/30* (2013.01); *C10B 53/07* (2013.01);
(Continued)

(58) Field of Classification Search
CPC . B29B 17/02; B29B 2017/0496; F23G 5/033; F23G 5/0273; D01F 9/14;
(Continued)

(56) References Cited

U.S. PATENT DOCUMENTS

2007/0269363 A1   11/2007 Murai
2013/0256113 A1*  10/2013 Tumiatti ................... F23G 5/20
                                                          201/19

FOREIGN PATENT DOCUMENTS

JP       2008032300 A       2/2008
WO    WO 2012/085880  *  6/2012 ................ F27B 7/02

OTHER PUBLICATIONS

Ushikoshi et al., Recycling of CFRP by Pyrolysis Method, J. Soc. Med. Sci. Japan, 1995.
(Continued)

*Primary Examiner* — Daniel C. McCracken
(74) *Attorney, Agent, or Firm* — Edward E. Sowers; Brannon Sowers & Cracraft PC

(57) ABSTRACT

The invention relates to a pyrolysis plant and a process for recovering (recycling) carbon fibers from carbon fiber-containing plastics, in particular from carbon fiber-reinforced plastics (CFPs or CFP materials), preferably from carbon fiber-containing and/or carbon fiber-reinforced composites (composite materials).

16 Claims, 6 Drawing Sheets

(51) Int. Cl.
  *B09C 1/06* (2006.01)
  *C10B 47/30* (2006.01)
  *C10B 53/07* (2006.01)
  *D01F 9/12* (2006.01)
  *D01F 9/14* (2006.01)
  *F23G 5/027* (2006.01)
  *F23G 5/033* (2006.01)
  *B29K 707/04* (2006.01)
  *B29K 105/06* (2006.01)
  *B29B 17/04* (2006.01)

(52) U.S. Cl.
  CPC ............... *D01F 9/12* (2013.01); *D01F 9/14* (2013.01); *F23G 5/0273* (2013.01); *F23G 5/033* (2013.01); *F27B 7/20* (2013.01); *B29B 2017/0496* (2013.01); *B29K 2105/06* (2013.01); *B29K 2707/04* (2013.01); *Y02P 20/143* (2015.11); *Y02W 30/62* (2015.05)

(58) Field of Classification Search
  CPC ... D01F 9/12; F27B 7/20; C10B 53/07; C10B 47/30; B09C 1/065; B09C 1/06; Y02P 20/143; Y02W 30/622; Y02W 30/625; B29K 2105/06; B29K 2707/04
  See application file for complete search history.

(56) References Cited

OTHER PUBLICATIONS

Torayca, T300 Technical Data Sheet, 1989.
Jiang et al., Characterisation of carbon fibres recycled from carbon fibre/epoxy resin composites using supercritical n-propanol, Composites Science and Technology, pp. 192-198, 2009.
Jiant et al., Measurement of Surface Energy of Recycled Carbon Fibres Using a Capillary Intrusion Method, 18th International Conference of Composite Materials, 2011.
Shi et al., Research in recycling technology of fiber reinforced polymers for reduction of environmental load: Optimum decomposition conditions of carbon fiber reinforced polymers in the purpose of fiber reuse, In Advanced Materials Research, vol. 343, pp. 142-149, Trans Tech Publications, 2012.

* cited by examiner

PYROLYSIS SYSTEM AND METHOD OF RECOVERING CARBON FIBRES FROM CARBON-FIBRE-CONTAINING PLASTICS

CROSS-REFERENCES TO RELATED APPLICATIONS

This patent application is a continuation of U.S. application Ser. No. 14/780,840, entitled "PYROLYSIS SYSTEM AND METHOD OF RECOVERING CARBON FIBRES FROM CARBON-FIBRE-CONTAINING PLASTICS" filed on Sep. 28, 2015, which claims priority to PCT/EP 2014/055980 filed on Mar. 25, 2014, to EP 13 001 625.6 filed Mar. 28, 2013, and to EP 13 001 994.6 filed Apr. 16, 2013, and incorporates all by reference herein, as if each one were independently incorporated in its entirety.

BACKGROUND OF THE INVENTION

The present invention relates to the technical field of recovery (recycling) of carbon fibers from carbon fiber-containing plastics, in particular from carbon fiber-reinforced plastics (CFPs), preferably from carbon fiber-containing or carbon fiber-reinforced composites (composite materials).

In particular, the present invention relates to a pyrolysis plant for recovering (recycling) carbon fibers from carbon fiber-containing plastics, in particular from carbon fiber-reinforced plastics (CFPs or CFP materials), preferably from carbon fiber-containing and/or carbon fiber-reinforced composites (composite materials), and also its use for recovering (recycling) carbon fibers from carbon fiber-containing plastics.

Furthermore, the present invention relates to a process for recovering (recycling) carbon fibers from carbon fiber-containing plastics, in particular from carbon fiber-reinforced plastics (CFPs), preferably from carbon fiber-containing or carbon fiber-reinforced composites (composite materials), and also the recycled carbon fibers obtainable by this process and their use.

The present invention additionally relates to plastics, building materials or cement-containing systems which comprise recycled carbon fibers obtainable by the process of the invention, or which have been produced using recycled carbon fibers obtainable by the process of the invention.

Finally, the present invention relates to shaped bodies (e.g. components), molds and sheet-like materials (e.g. nonwovens), in particular in the form of composite materials or compounds which comprise recycled carbon fibers obtainable by the process of the invention or which have been produced using recycled carbon fibers obtainable by the process of the invention.

In general, carbon fiber-reinforced plastics (also known synonymously as CFPs) in which a multiplicity of carbon fibers are embedded, preferably in a plurality of layers, as reinforcement in a matrix such as plastic can be referred to as fiber-plastic composites. As polymer matrix, it is possible to use both thermosets such as epoxy resins, acrylates and polyurethanes and also thermoplastics such as acrylonitrile-butadiene-styrene (ABS), polyamide (PA), polylactate (PLA), polymethyl methacrylate (PMMA), polycarbonate (PC), polyethylene terephthalate (PET), polyethylene (PE), polypropylene (PP), polystyrene (PS), polyether ether ketone (PEEK) and polyvinyl chloride (PVC). However, it is also possible to embed carbon fibers in a matrix composed of ceramic (also referred to synonymously as ceramic fiber composites) in order to obtain thermally very stable components such a brake disks.

Carbon fiber-reinforced plastics (CFPs) have a high strength and stiffness combined with a low weight and are preferably used in fields where high weight-specific strengths and stiffnesses are required. For example, CFPs are used in the aerospace industry, in the wind power industry, in vehicle construction or for sports equipment such as bicycle frames, speed skates, tennis rackets, sporting arrows and fishing rods. In building and construction, carbon fiber-reinforced plastics (CFPs) can be adhesively bonded in the form of lamellae on the surface of the component in order to reinforce constructions.

The strength and stiffness of materials or components produced from carbon fiber-reinforced plastics (CFPs) is generally, as in the case of other fiber-matrix composites, significantly higher in the fiber direction than transverse to the fiber direction. Thus, for example, the strength transverse to the carbon fibers can be lower than the strength of the matrix material used. In order to ensure a uniform strength and stiffness of the materials or components composed of CFPs in all directions in space, individual fiber layers are laid in various directions. For example, in the case of high-performance construction components, the fiber directions can be determined by means of computer calculations such as the classical laminate theory in order to achieve the prescribed strength and stiffness.

The primary carbon fibers (also referred to synonymously as virgin fibers) used in the production of CFPs are predominantly produced industrially from carbon-containing starting materials, in particular polyacrylonitrile (PAN), by stabilization reactions in air, subsequent pyrolysis in an inert atmosphere and subsequent graphitization. The stiffness and strength of the primary carbon fibers can be controlled in a targeted manner during the production process by means of the pretensioning and also the temperatures in the carbonization and graphitization, so that various fiber types are commercially available. Owing to their inexpensive production, HT fibers (high-tensile fibers) and IM fibers (intermediate modulus fibers) are predominantly used as primary carbon fibers. In order to improve the adhesion of the primary carbon fibers after graphitization, an oxidation of the surface of the primary carbon fibers can be carried out by means of an electrochemical treatment.

In general, the primary carbon fibers are subsequently provided with a size such as an epoxy resin and collected together to form rovings. These rovings are wound up onto conventional textile spindles in a last step.

Depending on the length of the primary carbon fibers used, various processes can be used for producing carbon fiber-reinforced plastics (CFPs). CFP parts having long primary carbon fibers can generally be produced by means of resin injection processes (also referred to as resin transfer molding (RTM)). In a first step of the resin injection process, preforms which consist of one layer or a plurality of layers of woven primary carbon fibers in order to ensure constant strength and stiffness in all directions in space are produced. These preforms are, in a second step, admixed in a closed casting mold with a liquefied matrix composed of plastic and optionally hardener. After curing of the matrix and removal of excess edge material, the corresponding CFP components are obtained.

The production of carbon fiber-reinforced plastics (CFPs) having short primary carbon fibers, in particular chopped primary carbon fibers, is generally carried out by means of injection molding. For this purpose, the chopped primary carbon fibers are mixed batchwise with a liquefied matrix composed of plastic(s), extruded and subsequently processed by means of injection molding to give CFP components.

However, the use of carbon fiber-reinforced plastics (CFPs) leads, in comparison with the use of similar components composed of light metals such as aluminum, magnesium and titanium, to considerably higher costs of the final product. This is related, in particular, to the complicated and costly production of primary carbon fibers from carbon-containing starting materials, in particular polyacrylonitrile (PAN). In addition, the worldwide consumption of primary carbon fibers for producing CFP components is increasing greatly, so that no significant reduction of the costs in the use of carbon fiber-reinforced plastics can be expected because of the high worldwide demand for primary carbon fibers.

Despite the high demand for primary carbon fibers, large quantities of primary carbon fibers which are unprocessed but have been preimpregnated with a plastic (referred to as prepregs or preimpregnated fibers), in which the plastic has been cured or which have exceeded the storage date, are disposed of as CFP-containing scrap.

In addition, large amounts of CFP-containing plastic scrap, which has to be disposed of, are obtained in the production of aircraft parts and parts for wind turbines and also as a result of modeling molds, production scrap, prototypes, incorrect batches and "end-of-life" components to be disposed of.

However, the disposal of CFP-containing plastics scrap in landfills is uneconomical because of the valuable carbon fibers present therein. Furthermore, it can generally be expected that the CFP-containing plastics scrap remains unchanged over a long period of time because of its chemical inertness and cannot be degraded in landfills. In addition, unlimited disposal of CFP-containing scrap is not readily possible or even prohibited because of legal requirements in many European countries.

There is therefore a great demand for inexpensive and efficient pyrolysis plants and processes for recovering or recycling carbon fibers from CFP-containing scrap, in particular in the light of the worldwide demand for carbon fibers for the production of CFP components.

In the prior art, carbon fibers are recovered or recycled from CFP-containing material (CFP material) by means of pyrolysis. For the purposes of the present invention, pyrolysis is, in particular, thermal dissociation of organic compounds, in which large organic molecules are split into smaller organic molecules by means of high temperatures, for example in the range from 300 to 1000° C. In general, no oxygen is introduced during the pyrolysis. Thus, it has hitherto been necessary to use sealed and complex pyrolysis plants and also complicated processes in order to ensure an inert atmosphere or the use of reduced pressure during the removal of the polymer matrix. However, pyrolysis processes are sometimes also operated in an oxygen-containing atmosphere, in particular under controlled conditions.

Such a pyrolysis plant is described in the document EP 0 636 428 A1. There, a protective gas furnace in which CFP-containing material is pyrolyzed under a protective gas atmosphere is used for carrying out the pyrolysis. However, the pyrolysis is carried out over a long period of time, as a result of which the recycling is uneconomical and is not suitable for the industrial scale. Furthermore, a complicated after-treatment of the recycled materials with further pyrolysis steps is provided in order to obtain carbon-containing shaped bodies.

Furthermore, circulation of the CFP material is not possible in the known pyrolysis plants using belt furnaces and the processes carried out therein for recovering carbon fibers from CFP material. There is therefore no mixing of the CFP material and accordingly also no uniform heating of all regions of the CFP material present on the conveyor belt. The result is considerable pyrolysis and resin residues on the surface of the recycled carbon fibers, which can have an adverse effect on incorporation into a polymer matrix.

Such a pyrolysis plant is described, for example, in the document DE 10 2008 002 846 B4 and in the patent family equivalent EP 2 282 879 A1. The pyrolysis of the polymer matrix is carried out in a pyrolysis plant which comprises a belt furnace, with the CFP-containing scrap firstly having to be presorted and subsequently comminuted to small sizes. In addition, it is necessary to carry out after-treatment of the recycled carbon fibers in order to avoid tangling of the recycled carbon fibers.

In addition, the document WO 2010/075952 A1 describes a pyrolysis plant which comprises a process chamber in the form of a belt furnace or rotary tube furnace. The process chamber has both heating sources in the form of hot air inlets and electric resistance heating elements and also microwave radiation sources, which is why a complicated apparatus is consequently necessary for carrying out the recycling.

Finally, the document EP 2 152 487 B1 describes a pyrolysis plant having a belt furnace, with the proportion of oxygen in the belt furnace being controlled in a targeted manner by means of control devices so that essentially a pyrolysis and no combustion or gasification of the polymer matrix occurs.

Furthermore, the abovementioned pyrolysis plants and processes lead not only to the large amount of pyrolysis residues on the surface of the recycled carbon fibers but also to high costs for the recovery (recycling) of carbon fibers from CFP-containing scrap because of their complexity. In addition, the surfaces of CFP-containing scrap are not treated uniformly in the abovementioned pyrolysis plants and processes because of the nonoptimum mixing. The recycled carbon fibers also frequently display quality fluctuations.

In addition, the CFP-containing scrap has to be pretreated in a complicated fashion, in particular by means of mechanical and/or chemical processes, before recovery (recycling).

For this reason, the use of recycled carbon fibers in CFP components has hitherto been possible to only a limited extent because of the above-described disadvantages.

Processes for recycling carbon fibers from CFP-containing scrap on the laboratory scale are also known in the prior art. However, these processes are often complex and unsuitable for the recycling of carbon fibers on the industrial scale.

SUMMARY

It is therefore an object of the present invention to provide a pyrolysis plant and a corresponding process for recovering (recycling) carbon fibers from carbon fiber-containing plastics, in particular from carbon fiber-reinforced plastics (CFPs or CFP materials), preferably from carbon fiber-containing and/or carbon fiber-reinforced composites (composite materials), with the abovementioned disadvantages associated with the prior art being at least largely avoided or else at least decreased.

In particular, it is an object of the present invention to provide a pyrolysis plant and a corresponding process for recovering (recycling) carbon fibers from carbon fiber-containing plastics, with the pyrolysis plant or the process ensuring uniform heating of the CFP-containing material during decomposition of the polymer matrix. In addition, the pyrolysis plant and the process should allow inexpensive recovery (recycling) of carbon fibers which can be carried out on an industrial scale. Furthermore, the use of the pyrolysis plant or the process should give recycled carbon fibers which are at least essentially free of pyrolysis or carbonization residues and display good incorporability into plastics.

The applicant has now surprisingly found that the abovementioned objects can be achieved in an efficient way when a pyrolysis plant which has, inter alia, an indirectly heated rotary tube furnace having exit openings is used for recovering (recycling) carbon fibers from carbon fiber-containing plastics. The use of the indirectly heated rotary tube furnace having exit openings makes it possible to obtain a precisely specified atmosphere within the rotary tube furnace since pyrolysis gas formed can be removed in a controlled manner through the exit openings and, in particular, the oxygen content within the indirectly heated rotary tube furnace can be controlled by means of this removal. In addition, the uniform mixing of the CFP material as a result of the rotary tube furnace ensures uniform heating and thus uniform pyrolysis of the polymer matrix. Owing to the uniform pyrolysis of the polymer matrix, recycled carbon fibers which have been at least essentially completely freed of the matrix material and have essentially no pyrolysis residues (hereinafter also referred to synonymously as pyrolysis coke residues) on the surface of the recycled carbon fibers and thus better incorporability into plastics compared to primary carbon fibers and conventionally recycled carbon fibers are obtained.

To solve the abovementioned problem, the present invention thus proposes a pyrolysis plant for recovering (recycling) carbon fibers from carbon fiber-containing plastics, in particular from carbon fiber-reinforced plastics (CFPs or CFP materials), preferably from carbon fiber-containing and/or carbon fiber-reinforced composites (composite materials) as described herein. Further, advantageous properties of the pyrolysis plant of the invention are subject matter of the relevant dependent claims directed to the pyrolysis plant.

The present invention further provides for the use of the pyrolysis plant according to the present invention for recovering (recycling) carbon fibers from carbon fiber-containing plastics, in particular from carbon fiber-reinforced plastics (CFPs or CFP materials), preferably from carbon fiber-containing and/or carbon fiber-reinforced composites (composite materials) as described herein.

The present invention also provides a process for recovering (recycling) carbon fibers from carbon fiber-containing plastics, in particular from carbon fiber-reinforced plastics (CFPs or CFP materials), preferably from carbon fiber-containing and/or carbon fiber-reinforced composites (composite materials) as described herein. Further, advantageous properties of the process of the invention are subject matter of the relevant dependent process claims.

Furthermore, the present invention provides the recycled carbon fibers obtainable by the process of the invention as described herein. Further, advantageous properties of the recycled carbon fibers according to the invention are subject matter of the relevant dependent claims directed to the recycled carbon fibers.

In addition, the present invention further provides the use according to the invention of the recycled carbon fibers, as is described and defined in the corresponding use claims.

The present invention also provides plastics, building materials or cement-containing systems as described herein which comprise recycled carbon fibers obtainable by the process of the invention or which have been produced using recycled carbon fibers obtainable by the process of the invention.

Finally, the present invention provides shaped bodies (e.g. components), molds and sheet-like materials (e.g. nonwovens), in particular in the form of composite materials or compounds, as described herein which comprise recycled carbon fibers obtainable by the process of the invention or which have been produced using recycled carbon fibers obtainable by the process of the invention.

It goes without saying that particular configurations and embodiments which are described only in the context of one aspect of the invention also apply analogously to the other aspects of the invention without this being expressly indicated.

In addition, a person skilled in the art can, for a particular application or an individual case, deviate from the numbers, values or ranges indicated below without going outside the scope of the present invention.

The present invention thus provides, according to a first aspect of the present invention, a pyrolysis plant for recovering (recycling) carbon fibers from carbon fiber-containing plastics, in particular from carbon fiber-reinforced plastics (CFPs or CFP materials), preferably from carbon fiber-containing and/or carbon-reinforced composites (composite materials), having an elongated pyrolysis furnace for the continuous pyrolysis of CFP material which operates continuously during operation, having an input station for introduction of CFP material to be processed into the pyrolysis furnace at its one end, having an output station for discharge of recovered carbon fiber material from the pyrolysis furnace at its other end, having a gas offtake device for pyrolysis gas produced in the pyrolysis furnace and having a control device, in particular for regulating at least individual constituents of the gas in the pyrolysis furnace, in particular for regulating the proportion of oxygen (oxygen content) in the gas in the pyrolysis furnace, wherein the pyrolysis furnace is an indirectly heated rotary tube furnace which has at least the following constituents:

an elongated rotary tube which forms the accommodation space for the CFP material to be processed and is connected to the input station and the output station, with the rotary tube being provided on its cylindrical wall with exit openings for discharging pyrolysis gas formed during the pyrolysis over at least part of its length, and a housing which is insulated from the outside and at least partly surrounds the rotary tube and has openings for the input station and optionally also for the output station and has discharge lines, in particular for the pyrolysis gas.

For the purposes of the present invention, a rotary tube furnace is, in particular, a furnace for continuous processes to which heat is supplied in process engineering. In contrast to a directly heated rotary tube furnace in which the introduction of heat occurs within the furnace, in the case of an indirectly heated rotary tube furnace the heat is transferred from outside the reaction space via the rotary tube wall. In general, the indirectly heated rotary tube furnace has an input station, frequently in the form of a feed screw or a feed belt, the rotary tube which forms the core of the rotary tube furnace, an output station at the end of the rotary tube furnace for discharging the processed material, a bearing for the rotary tube and a drive for the rotary tube or a plurality of drives distributed over the length of the rotary tube and finally a housing which is insulated from the outside and surrounds the rotary tube and in which the quantity of heat required for the interior of the rotary tube is introduced or generated in any way.

The indirectly heated rotary tube furnace used according to the invention has at least the following constituents:

An elongated rotary tube which forms the accommodation space for the CFP material to be processed and is connected to the input station and the output station, with the rotary tube being provided on its cylindrical wall with exit openings for discharging pyrolysis gas formed during the pyrolysis over at least part of its length, and a housing which is insulated from the outside and surrounds the rotary tube and has openings for the input station and the output station and discharge lines, in particular for the pyrolysis gas.

According to the invention, the rotary tube of the rotary tube furnace used as pyrolysis furnace is in this case configured in a particular way: it has exit openings on its cylindrical wall over at least part of its length (i.e. a plurality or multiplicity of exit openings, e.g. in particular at least five exit openings, preferably at least ten exit openings) for discharging pyrolysis gas formed during the pyrolysis. The pyrolysis furnace in the form of a rotary tube furnace is thus particularly well adapted to the peculiarities of the pyrolysis. The pyrolysis gas should be able to escape very promptly from the rotary tube at the place at which it is formed in order to hinder the pyrolysis process as little as possible.

In a conventional belt furnace of the prior art, the CFP material in the pyrolysis furnace is open toward the top and the pyrolysis gas formed can escape in an upward direction at any point, but there is insufficient circulation and mixing of the CFP material to be treated. When a conventional rotary tube in a rotary tube furnace of the prior art is used, the pyrolysis gas formed cannot, in contrast, escape in an upward direction, so that the pyrolysis gas would surround the CFP material and would hamper further pyrolysis. Although a conventional rotary tube furnace of the prior art would have some effect in respect of mixing and circulation of the CFP material, this would be countered by considerable disadvantages in respect of the lack of ability to discharge the pyrolysis gas formed during the pyrolysis. Only the use according to the invention or the provision according to the invention of the exit openings in the cylindrical wall on at least part of its length, namely at least where a particularly large amount of pyrolysis gas is formed, leads to an appropriate solution for a pyrolysis plant for recovering (recycling) carbon fiber-containing plastics.

The use of the pyrolysis plant of the invention, which comprises an indirectly heated rotary tube furnace having exit openings, firstly allows uniform mixing, circulation and heating of the CFP material in the pyrolysis furnace, and secondly efficient discharge of the pyrolysis gases through the exit openings in the rotary tube wall is at the same time made possible. This results in optimal pyrolysis conditions and thus in selective removal of only the polymer matrix without destruction of the carbon fibers to be recovered at any place in the rotary tube furnace, so that at least essentially no pyrolysis residues remain on the surface of the recycled carbon fibers after complete removal of the polymer matrix.

Furthermore, the exit openings in the indirectly heated rotary tube furnace of the pyrolysis plant of the invention allow control of the atmosphere, in particular the oxygen content, within the rotary tube furnace. In combination with the indirect heating of the rotary tube furnace, by means of which temperature fluctuations are avoided, a selective and at least essentially complete removal of the polymer matrix is made possible without the recycled carbon fibers being destroyed, in particular excessively damaged and/or excessively oxidized, since this would result in significantly reduced mechanical properties of the recycled carbon fibers.

The combination of uniform heating and mixing of the CFP-containing material with the targeted control of the oxygen content and/or the temperature, which is made possible by use of the pyrolysis plant of the invention having the indirectly heated rotary tube furnace with exit openings, leads to recycled carbon fibers of constantly high quality which, firstly, have at least essentially no pyrolysis or carbonization residues on their surface. Secondly, the above combination results in partial oxidation only of the surface of the recycled carbon fibers, i.e. in a rougher surface which displays more bonding affinity, in particular hydrophilic surface and in an increase in oxygen-containing groups, e.g. hydroxy, aldehyde, carboxyl groups, etc., on the surface of the resulting recycled carbon fibers. The partial oxidation of the surface of the recycled carbon fibers resulting from the combination of the pyrolysis plant of the invention and process conditions according to the invention leads, owing to the rougher and functionalized, in particular more hydrophilic, surface of the recycled carbon fibers, to increased wettability and thus also to improved incorporability into plastics compared to primary carbon fibers or conventionally recycled carbon fibers.

As a result, the recycled carbon fibers have at least essentially no pyrolysis residues any more due to use of the pyrolysis plant according to the invention having an indirectly heated rotary tube furnace having exit openings in the rotary tube wall in combination with the targeted control of the oxygen content and/or the temperature, but the mechanical and electrical properties of the recycled carbon fibers are not or not significantly impaired by the recycling. Furthermore, the recycled carbon fibers have improved wettability and consequently improved incorporability into plastics because of the partial oxidation of the surface of the recycled carbon fibers.

Further advantages, properties, aspects and features of the present invention may be derived from the following description of preferred illustrative embodiments shown in the drawings. The above-described features and/or the features disclosed in the claims and/or in the following description of the figures can, if required, also be combined with one another even if this is not expressly described in detail.

DETAILED DESCRIPTION OF THE INVENTION

Figure 1:
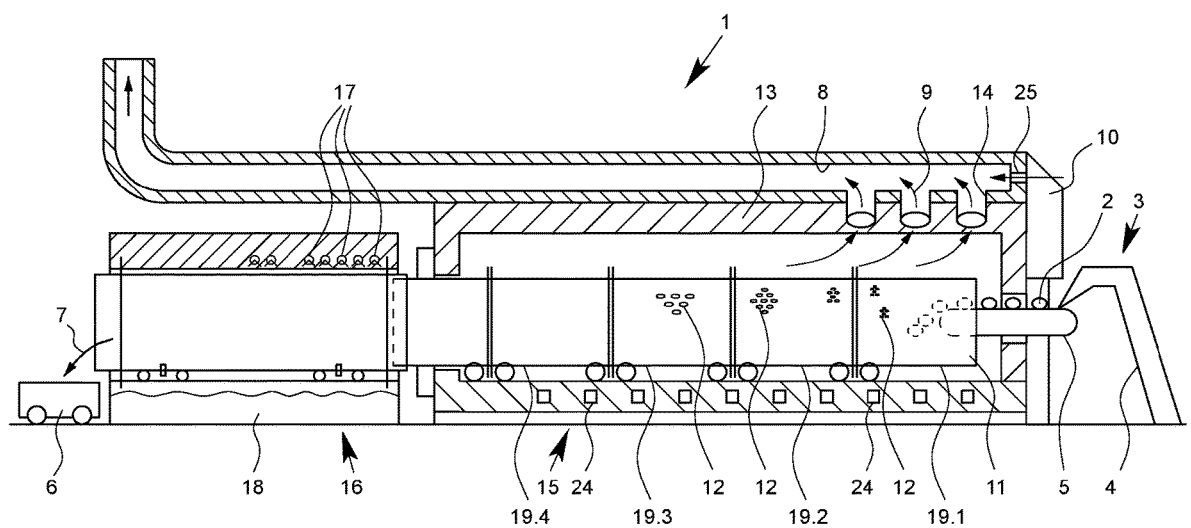
FIG. 1 schematically shows a longitudinal section of the rotary tube, not cut, as per a preferred embodiment of the pyrolysis plant of the invention.
Figure 2:
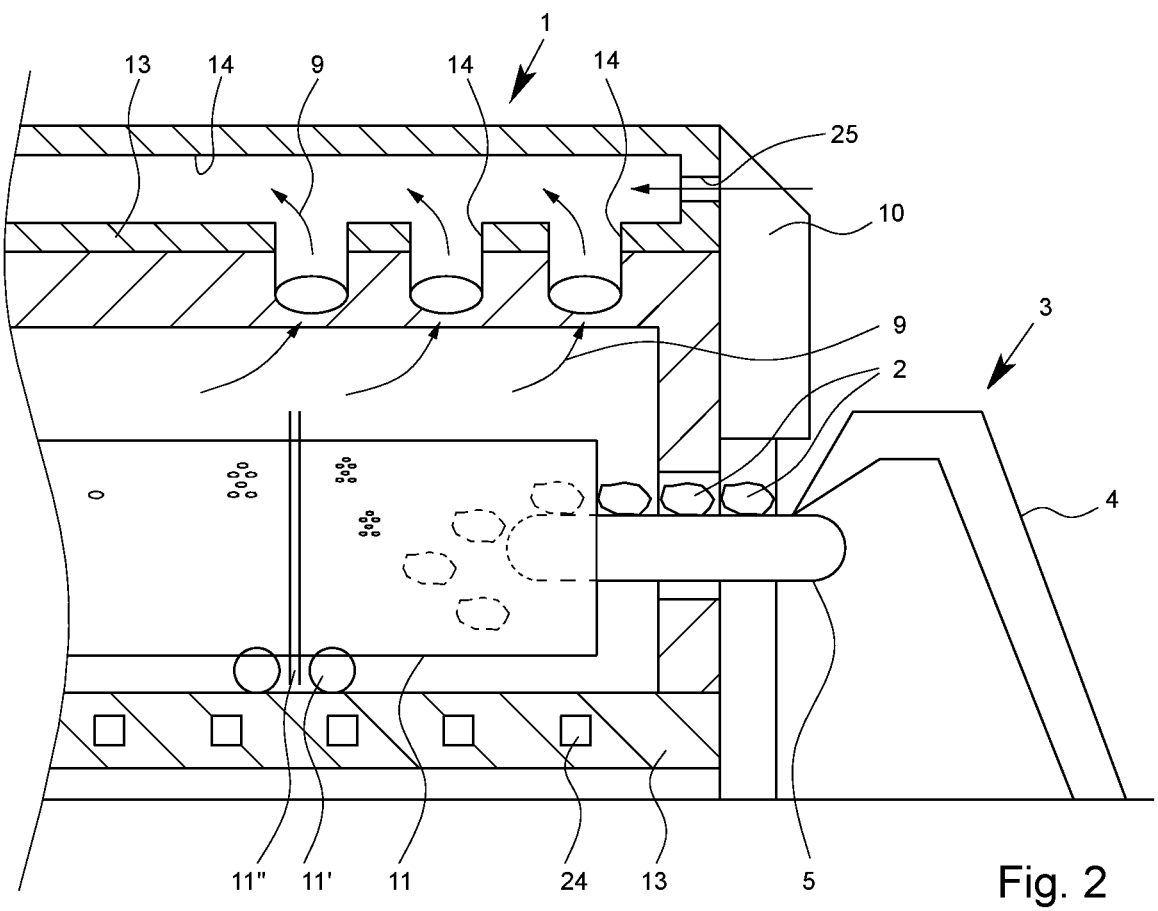
FIG. 2 shows a section of an enlarged depiction of the pyrolysis plant of FIG. 1 in the region of its right-hand end, i.e. in the region of the input station.
Figure 3:
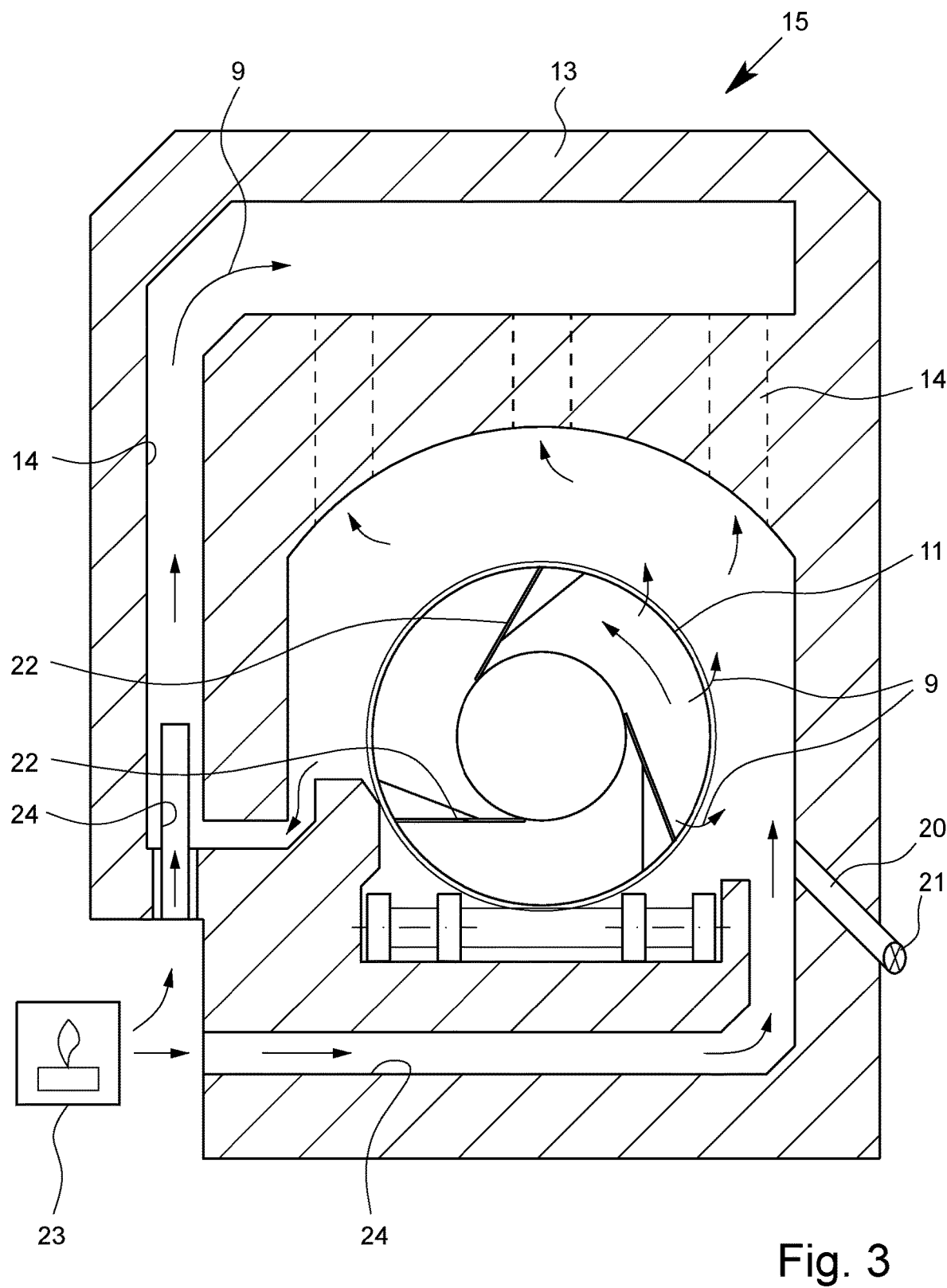
FIG. 3 schematically shows a depiction of a cross section through the pyrolysis plant of FIG. 1 in the starting region of the pyrolysis furnace.

The pyrolysis plant shown in FIGS. 1 to 3 serves, in the illustrative embodiment depicted, for recovery of carbon fibers from plastics reinforced with carbon fibers (CFP). For the total background to this recovery technique, reference may be made to the sources in the prior art mentioned at the outset.

FIGS. 1 to 3 show a pyrolysis plant according to the invention for recovering (recycling) carbon fibers from carbon fiber-containing plastics, in particular from carbon fiber-reinforced plastics (CFPs or CFP materials), preferably from carbon fiber-containing and/or carbon fiber-reinforced composites (composite materials), having an elongated pyrolysis furnace 1 for the continuous pyrolysis of CFP material 2 which operates continuously during operation, having an input station 3 for introducing CFP material 2 to be processed into the pyrolysis furnace 1 at its one end, having an output station 6 for discharging recovered carbon fiber material 7 from the pyrolysis furnace 1 at its other end, having a gas offtake device 8 for pyrolysis gas 9 produced in the pyrolysis furnace 1, which can then be conveyed into an off-gas treatment device, in particular after-combustion, and having a control device 10, in particular for regulating at least individual constituents of the gas in the pyrolysis furnace 1, in particular for regulating the proportion of oxygen (oxygen content) in the gas in the pyrolysis furnace 1. The pyrolysis furnace 1 is an indirectly heated rotary tube furnace which has at least the following constituents: an elongated rotary tube 11 which forms the accommodation space for the CFP material 2 to be processed and is connected to the input station 3 and the output station 6, with the rotary tube 11 being provided on its cylindrical wall with exit openings 12 for discharging pyrolysis gas 9 formed during the pyrolysis over at least part of its length, and a housing 13 which is insulated from the outside and at least partly surrounds the rotary tube 11 and has openings for the input station 3 and optionally also for the output station 6 and has discharge lines 14, in particular for the pyrolysis gas 9.

The pyrolysis plant shown schematically in longitudinal section in FIG. 1 has as its core an elongated, continuously operating pyrolysis furnace 1 for the continuous pyrolysis of CFP material 2. At the right-hand side of FIG. 1, it is possible to see an input station 3 for introducing the CFP material 2 to be processed. In FIG. 1, this CFP material 2 is poured by means of a chute 4 onto a continuous conveyor belt 5 which then transports the CFP material 2 into the pyrolysis furnace 1 at its one end.

At the left-hand side of FIG. 1, there is an output station 6 for discharging recovered carbon fiber material or recycled carbon fibers 7 from the pyrolysis furnace 1. There, the output station 6 is depicted as a simple movable collection tub. The pyrolysis plant has a gas offtake device 8 for pyrolysis gas 9 produced in the pyrolysis furnace 1. In FIG. 1, the flowing pyrolysis gas 9 is indicated by curved arrows.

Finally, the pyrolysis plant has a control device 10 for regulating the gas atmosphere in the pyrolysis furnace 1, in particular for regulating individual constituents of the gas in the pyrolysis furnace 1, preferably for regulating the proportion of oxygen or oxygen content.

For the purposes of the present invention, preference is given to the proportion of oxygen in the gas in the pyrolysis furnace 1 to be set to a substoichiometric value relative to the amount required for complete decomposition of the polymer matrix during the pyrolysis of the polymer matrix of the CFP material. Furthermore, preference is given to setting the oxygen content to a superstoichiometric value relative to the amount required for the decomposition of the polymer matrix in a further zone of the pyrolysis furnace 1 or after pyrolysis of the polymer matrix has occurred in order to remove any pyrolysis residues on the surface of the recycled carbon fibers at least essentially completely and to at least partially oxidize the surface.

To understand the teaching of the invention, FIGS. 1, 2 and 3 should now be looked at together because they allow different aspects of the teaching of the invention to be easily seen.

According to the invention, the pyrolysis furnace 1 is an indirectly heated rotary tube furnace. This indirectly heated rotary tube furnace firstly has an elongated rotary tube 11 forming the accommodation space for the CFP material 2 to be processed. This is connected both to the input station 3 and to the output station 6. The rotary tube is, as is normal in a rotary tube furnace (see, for example, DE 10 2004 036 109 A1), mounted so as to be rotatable, e.g. either via rolls or via appropriate ball bearings. In addition, there is a rotational drive for the rotary tube 11, which is not shown in FIG. 1. It can be seen that at the right-hand end the input station 3 with its conveyor belt 5 projects a little into the rotary tube 11 and that at the left-hand end the collection vessel of the output station 6 is directly below the outlet of the rotary tube 11.

It is important for the purposes of the invention that the rotary tube 11 is provided on its cylindrical wall with exit openings 12 for discharging pyrolysis gas 9 formed during the pyrolysis over at least part of its length. These exit openings 12 can be seen at various places in FIG. 1. In FIG. 3, the exit openings 12 in the rotary tube 11 are indicated by the flow arrows shown there for the pyrolysis gas 9.

It is important that the pyrolysis gas 9 can be discharged continuously from the rotary tube 11 close to the place at which it arises. In this way, the oxygen content within the rotary tube 11 can be controlled in a targeted manner, as explained at the outset.

FIG. 2 shows an enlargement of the right-hand end of the pyrolysis furnace 1 closest to the input station 3. In addition to what is shown in FIG. 1, roller bearings 11' of the rotary tube 11 can be seen at the bottom in FIG. 2. These roller bearings 11' support the rotary tube in such a way that temperature-related expansion in the longitudinal direction is made possible. Between these roller bearings 11', there is in each case a cog wheel 11" with which an appropriate rotational drive engages.

A further important constituent according to the invention of the pyrolysis plant is a housing 13 which is insulated from the outside and surrounds the rotary tube 11 and has an opening for the input station 3 in the pyrolysis furnace 1. In FIG. 1, the opening for the input station 3, highly insulated from the rotary tube 11, can be seen at right. The insulation takes account of the fact that this is the "hot" end of the rotary tube 11. At the left of FIG. 1, the output station 6 is in contrast outside the housing 13. This peculiarity will be discussed in detail below.

Finally, discharge lines 14 in which, in particular, the pyrolysis gas 9 is discharged are also present in the housing 13.

The preferred embodiment of a pyrolysis plant according to the invention shown in FIG. 1 is characterized, according to a further peculiarity, in that the rotary tube 11 has a first heating section 15 extending from the input station 3 and a second, adjoining cooling section 16 leading to the output station 6. In FIG. 1, the heating section 15 of the rotary tube 11 can be seen at right where the housing 13 is also provided. This surrounds the rotary tube 11 only in the heating section 15. Only there is the insulation from the outside required, since only there is the high heat input required. The discharge lines 14 for the pyrolysis gas 9 are also located there. Somewhat to the left of the middle of the depiction of the pyrolysis plant in FIG. 1, it is possible to see the opening for the rotary tube 11 into the cooling section 16. The opening in the housing 13 is thus not at the output station 6 but instead inside the pyrolysis furnace 1 between heating section 15 and cooling section 16.

FIG. 2 shows the right-hand end of the heating section 15 of the pyrolysis furnace 1.

The preferred embodiment depicted makes it clear that, in the embodiment shown, the rotary tube 11 is cooled by means of water or can be cooled by means of water in the cooling section 16; the water is distributed from above via spray nozzles 17 and is collected in a collection pan 18 under the cooling section 16 of the rotary tube 11. This makes it possible for the recycled carbon fibers 7 to be discharged at a relatively low temperature at the output station 6.

It is advisable for the rotary tube 11 to have no exit openings in the cooling section 16 in any case.

As regards the configuration of the rotary tube 11 in the heating section 15 of the pyrolysis furnace 1, the exit openings 12 are distributed essentially uniformly over the circumference of the rotary tube 11. Only some of the exit openings 12 distributed over the circumference are indicated in FIGS. 1 and 2. However, this should be considered to be merely illustrative for the complete circumference of the rotary tube 11. Distribution over the entire circumference is useful because the rotary tube 11 rotates continuously, if not for any other reason.

It can be seen in FIGS. 1 and 2 that the size of the exit openings 12 is not the same everywhere in the embodiment depicted there. In the first section at far right, the exit openings 12 are still relatively small. There, the CFP material 2 has not yet been heated very strongly, so that only small amounts of pyrolysis gas 9 are given off. Large amounts of pyrolysis gas 9 are formed only in the next two sections of the heating section 15, so that the exit openings 12 in the rotary tube 11 are also significantly larger in diameter there. In the next section the exit openings decrease again both in density and size because the pyrolysis is largely finished there.

According to the invention, the size of the exit openings 12 or the different sizes of the exit openings 12 is/are matched to the size of the CFP material 2 and also the carbon fibers present therein or the size of the exit openings 12 or the different sizes of the exit openings 12 can be matched to the size of the CFP material 2 and the carbon fibers present therein and/or are adjustable and/or regulatable so that the CFP material 2 or the recycled carbon fibers do not fall out from the rotary tube 11 into the housing 13. This should not be the case to any considerable extent since otherwise the recovery aspect would be countered.

In a variant of the teaching of the invention which is not shown, the rotary tube 11 can be matched to different CFP materials 2 by the exit openings 12 in the rotary tube 11 being made adjustable.

FIGS. 1 and 2 show still a further peculiarity of the construction of the pyrolysis plant according to the invention in this illustrative embodiment. It can be seen that the discharge lines 14 for the pyrolysis gas are located in the housing 13 in the heating section 15 and there once again at the end closest to the input station 3. With this arrangement in the first third of the housing 13 closest to the input station 3, particularly hot pyrolysis gas 9 formed further back in the housing 13 flows in counter current to the flow direction of the CFP material 2 in the direction of the input station 3 and there additionally contributes to heating of the CFP material 2. As a result of this "backflow", a more uniform heat distribution through to the input end of the pyrolysis furnace 1 is thus achieved.

It has already been indicated above that the rotary tube 11 in the pyrolysis furnace 1 of the pyrolysis plant of the invention should also be configured in a particular way in terms of the heating. According to preferred teaching of the invention, a plurality of sections 19 having different gas temperatures are provided in the housing 13 along the length of the rotary tube 11 or a plurality of sections 19 having differently regulatable gas temperatures are provided (i.e. the gas temperatures in the individual sections 19 can be regulated differently or differently from one another) and the exit openings 12 in the rotary tube 11 are provided at least in the section having the highest gas temperature.

Something has already been said above about the different formation of pyrolysis gas 9 in the different sections 19 of the heating section 15 of the rotary tube 11. In a further embodiment of the teaching of the invention explained last, it is advisable for the pyrolysis furnace 1 to have a plurality of sections 19, in particular at least one heating-up zone 19.1, a first pyrolysis zone 19.2, a second pyrolysis zone 19.3 and a cooling zone 19.4.

Furthermore, in a preferred embodiment of the present invention, the composition of the gas in the pyrolysis furnace 1 is regulated differently in the various sections 19 of the rotary tube 11 (i.e. the composition of the gas in the pyrolysis furnace 1 is different or can be regulated differently in the various sections 19 of the rotary tube 11), especially with a low proportion of oxygen (oxygen content) in a first pyrolysis zone 19.2 and a higher proportion of oxygen (oxygen content) compared to the first pyrolysis zone 19.2 in a second pyrolysis zone 19.3.

In addition, it can be preferred according to the invention for the composition of the gas and/or the temperature in the pyrolysis furnace 1 to be regulated differently or to be able to be regulated differently in the various sections 19 of the rotary tube 11, preferably with a defined proportion of oxygen (oxygen content) G(B1) and/or with a defined temperature T(B1) in a first pyrolysis zone 19.2 and with a defined proportion of oxygen (oxygen content) G(B2) and/or with a defined temperature T(B2) in a second pyrolysis zone 19.3. In particular, the oxygen content G(B2) in the second pyrolysis zone B2 is increased compared to the oxygen content G(B1) in the first pyrolysis zone B1 and/or the temperature T(B2) in the second pyrolysis zone B2 is increased compared to the temperature T(B1) in the first pyrolysis zone B1.

The temperatures indicated, in particular the temperatures T(B1) and T(B2) indicated, and the specific temperature values or temperature value ranges given below in this context relate, in particular, to the temperatures which are reached in the object to be treated or to be recycled.

FIG. 3 shows, in cross section close to the input station 3 in the heating section 15 of the pyrolysis furnace 1, at right an air inlet 20 having a control valve 21 which serves to introduce air and thus oxygen into the first section 19.1 of the heating section 15.

It is merely indicated in FIGS. 1 and 2 that, in the preferred embodiment depicted, the rotary tube 11 is inclined downward from the input station 3 to the output station 6. This inclination and the rotation of the rotary tube 11 about its longitudinal axis produces an axial transport motion of the CFP material 2 in the rotary tube 11. In the preferred embodiment depicted, the rotary tube 11 is additionally provided in its interior with mixing elements 22, namely with the deflection plates which can readily be seen in FIG. 3.

Figure 3A:
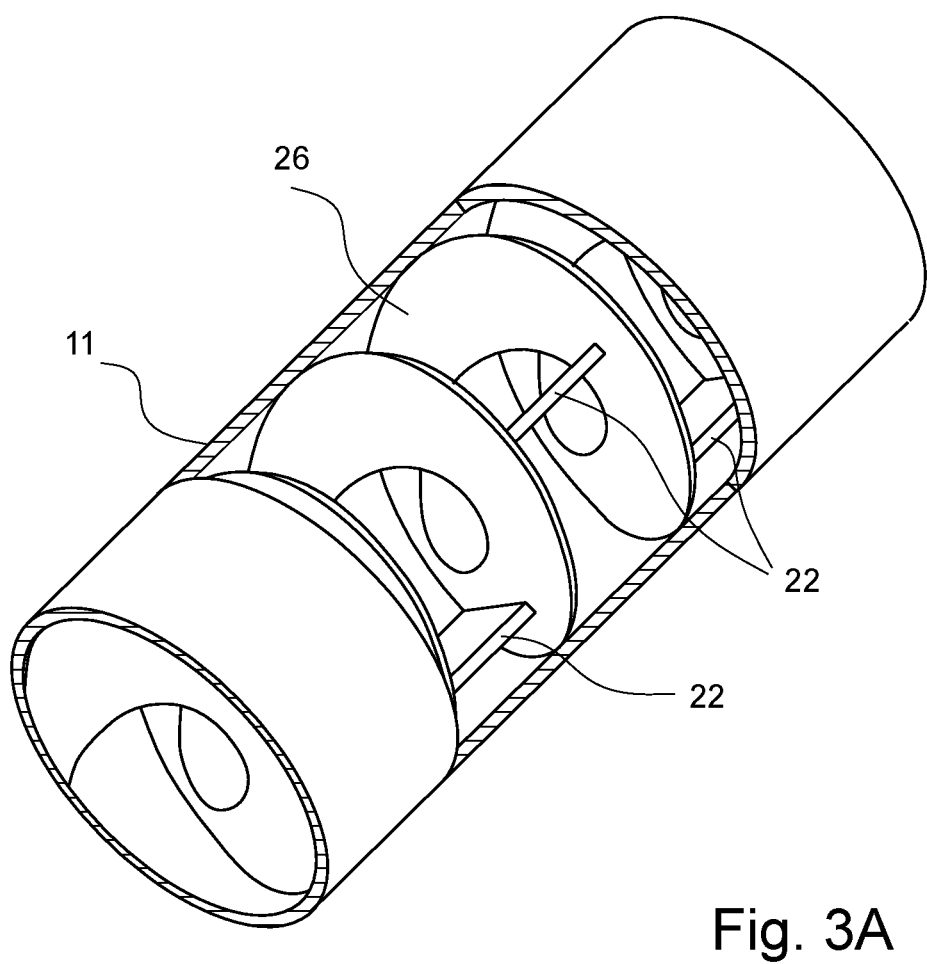
FIG. 3A schematically shows a depiction of a mixing and transport element as per a preferred embodiment of the present invention.
Figure 3B:
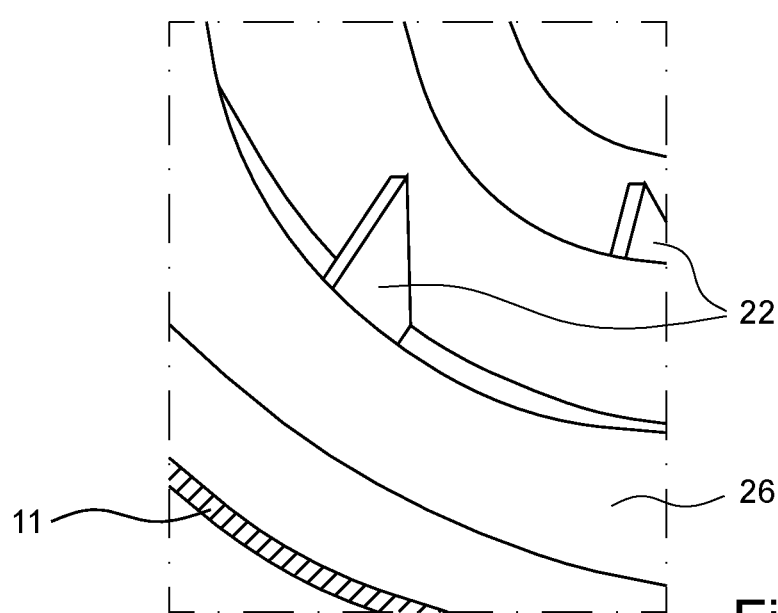
FIG. 3B schematically shows a sectional enlargement of the mixing and transport element depicted in FIG. 3A.

The depictions in FIGS. 3A and 3B show a peculiarity which is preferably used in the case of a rotary tube 11 used according to the invention. A combination of firstly mixing element 22 and secondly a transport element 26, preferably in the form of a feed screw, in particular a winding, helical or screw-like feed screw, preferably an Archimedes screw, is particularly preferred. As depicted in the enlargement of the transport element 26 in FIG. 3B, the mixing elements 22 are, according to the invention, preferably arranged between the individual windings of the transport element 26 in the form of a feed screw, in particular an Archimedes screw. The CFP material 2 is thus forcibly conveyed in the longitudinal direction of the rotary tube 11.

Figure 4:
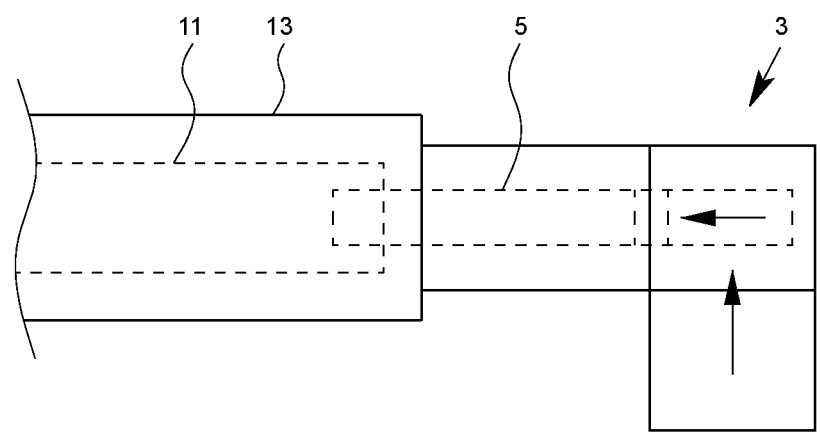
FIG. 4 schematically shows a lock arrangement for the input station as per a preferred embodiment of the pyrolysis plant of the invention.

FIG. 4 shows another peculiarity which is not shown in the other figures of the drawing. In one variant of the invention, it is possible for the input station 3 not to be equipped openly with a conveyor belt 5 as shown in FIG. 1 but instead to be configured as an input lock. The input lock 3 as per FIG. 4 operates like a type of air space screen by means of which it is ensured that the unavoidable introduction of oxygen with the introduction of CFP material 2 into the first section 19.1 of the heating section 15 of the pyrolysis furnace 1 can be controlled in terms of amount. The lock still allows pseudo continuous introduction of CFP material 2 in individual "portions". However, this is nevertheless a great advantage for precise control by means of the control device 10.

In an embodiment of the invention which is not shown in the figures, the pyrolysis plant of the invention can also have a comminution device for comminuting CFP material 2 to be processed, preferably arranged upstream of the input station 3. In other words, in this embodiment the pyrolysis plant of the invention has a comminution device for comminuting CFP material 2 to be processed arranged before or upstream of the input station 3 in the process direction (=process or operating direction). This ensures that the CFP material 2 which is to be processed and subsequently introduced into the input station has an optimal size or dimensions for the pyrolysis. Suitable comminution devices are, by way of example and not as a limitation, in the form of shredder, hacking, chopping, milling, tearing and/or cutting devices.

In a further embodiment of the invention which is likewise not shown in the figures, the pyrolysis plant can additionally have, preferably arranged downstream of the output station 6, a work-up device for working up, in particular sorting and/or comminuting, the recycled carbon fibers obtained from the CFP material 2. In other words, in this embodiment, the pyrolysis plant of the invention has a work-up device for working up, in particular sorting and/or comminuting, the recycled carbon fibers obtained from the CFP material 2 arranged after or downstream of the output station 6 in the process direction (=process or operating direction). This ensures that the recycled carbon fibers obtained from the CFP material 2 are optimally worked up for subsequent processing.

FIGS. 1 to 3 also show, in this context, that heating of the pyrolysis furnace 1 is effected by at least one external gas burner 23 via the heating gas lines 24 in the housing 13. In FIG. 3, the connection for the external burner 23 can be seen at bottom left and the arrows indicate the flow of the heating gas into the heating gas lines 24 in the interior of the housing 13 in which the rotary tube 11 rotates. These gases then leave the housing 13 again together with the pyrolysis gas via the discharge lines 14. The introduction via the heating gas lines 24, which are arranged transverse to the longitudinal extension of the rotary tube 11 in the bottom of the housing 13, can be seen in FIG. 1.

In FIG. 1, a connection 25 for an after-burner typically to be connected here can also be seen at top right on the discharge line 14 there. This greatly increases the temperatures of the gases in the discharge lines 14, so that aftercombustion of the pyrolysis gas 9 occurs there.

In FIG. 3, a pre-combustion at the inlet side going from the gas burner 23 can also be seen. Here, an after-combustion is commenced directly in a discharge line 14 at the outlet of the space accommodating the rotary tube 11 in the housing 13.

Typical temperatures in the rotary tube 11 are in the range from 200° C. to 750° C., while typical temperatures at the top downstream of the connection 25 are from 1000 to 1200° C. In this respect, reference may also be made to the comprehensive explanations in the prior art discussed at the outset.

The present invention further provides, according to a second aspect of the present invention, for the use of a pyrolysis plant according to the present invention for recovering (recycling) carbon fibers from carbon fiber-containing plastics, in particular from carbon fiber-reinforced plastics (CFPs or CFP materials), preferably from carbon fiber-containing and/or carbon fiber-reinforced composites (composite materials).

For more detailed information regarding this aspect of the invention, reference may be made to what has been said above in respect of the pyrolysis plant of the invention, which applies analogously to this aspect of the invention.

The present invention additionally provides, according to a third aspect of the present invention, a process for recovering (recycling) carbon fibers from carbon fiber-containing plastics, in particular from carbon fiber-reinforced plastics (CFPs or CFP materials), preferably from carbon fiber-containing and/or carbon fiber-reinforced composites (composite materials), wherein an object based on a carbon fiber-containing plastic which comprises carbon fibers in a polymer matrix is subjected to a multistage pyrolysis in the presence of oxygen, with the polymer of the polymer matrix being decomposed during the pyrolysis to give the carbon fibers, and the pyrolysis is carried out in a pyrolysis plant according to the present invention.

Figure 5:
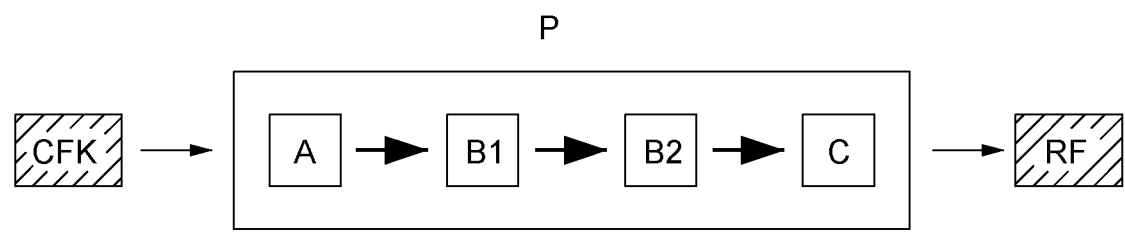
FIG. 5 schematically shows a flow diagram of the process of the invention for recovering (recycling) carbon fibers from carbon fiber-containing plastics as per a preferred embodiment of the process of the invention.

A particular embodiment of the process of the invention, which can be carried out in a pyrolysis plant as per FIG. 1, is shown in FIG. 5. This embodiment concerns a process for recovering (recycling) carbon fibers from carbon fiber-containing plastics, in particular from carbon fiber-reinforced plastics (CFPs or CFP materials), preferably from carbon fiber-containing and/or carbon fiber-reinforced composites (composite materials), in which an object based on a carbon fiber-containing plastic which comprises carbon fibers in a polymer matrix is subjected to a multistage pyrolysis in the presence of oxygen, with the polymer of the polymer matrix being decomposed during the pyrolysis to give the carbon fibers, where the pyrolysis is carried out in a pyrolysis plant as claimed in any of the preceding claims having a pyrolysis apparatus P, in particular a pyrolysis furnace 1, and the pyrolysis apparatus P comprises at least the following treatment zones, in particular the following sections 19 of the rotary tube 11, in the order specified below and the object goes through the following treatment zones in this order:

(A) a heating-up zone A (corresponds to the reference numeral 19.1 in FIG. 1) in which the object to be treated and/or to be recycled is heated to a defined temperature T(A), (B1) subsequently a first pyrolysis zone B1 (corresponds to the reference numeral 19.2 in FIG. 1) in which a pyrolysis of the polymer of the polymer matrix of the object to be treated occurs and/or is carried out at a defined temperature T(B1) and a defined oxygen content G(B1), (B2) subsequently a second pyrolysis zone B2 (corresponds to the reference numeral 19.3 in FIG. 1) in which a final pyrolysis of the polymer of the polymer matrix of the object to be treated still present after the pyrolysis zone B1 (corresponds to the reference numeral 19.2 in FIG. 1) is carried out at a defined temperature T(B2) and a defined oxygen content G(B2) to at least essentially complete removal, (C) subsequently a cooling zone C (corresponds to the reference numeral 19.4 in FIG. 1) for cooling the recycled carbon fibers RF obtained from the second pyrolysis zone B2 (corresponds to the reference numeral 19.3 in FIG. 1) (corresponds to the reference numeral 7 in FIG. 1), where the oxygen content G(B2) in the second pyrolysis zone B2 (corresponds to the reference numeral 19.3 in FIG. 1) is increased compared to the oxygen content G(B1) in the first pyrolysis zone B1 (corresponds to the reference numeral 19.2 in FIG. 1) and/or the temperature T(B2) in the second pyrolysis zone B2 (corresponds to the reference numeral 19.3 in FIG. 1) is increased compared to the temperature T(B1) in the first pyrolysis zone B1 (corresponds to the reference numeral 19.2 in FIG. 1).

The temperatures indicated, in particular the temperatures T(B1) and T(B2) indicated, and the specific temperature values and temperature value ranges indicated below in this context relate, in particular, to the temperatures which are reached in the object to be treated or to be recycled.

FIG. 5 schematically shows, according to a preferred embodiment of the invention, a flow diagram of the process of the invention for recovering (recycling) carbon fibers from carbon fiber-containing plastics, which is carried out in the pyrolysis plant as per FIG. 1. The polymer matrix of the carbon fiber-containing plastic CFP to be treated is firstly heated to a defined temperature in a heating-up zone A (corresponds to the reference numeral 19.1 in FIG. 1) in a pyrolysis apparatus P and in a subsequent step in a first pyrolysis zone B1 (corresponds to the reference numeral 19.2 in FIG. 1) is subjected to a selective pyrolysis at a defined temperature and a defined oxygen content. In a second pyrolysis zone B2 (corresponds to the reference numeral 19.3 in FIG. 1) following the first pyrolysis zone B1, the final pyrolysis of the remaining polymer matrix of the carbon fiber-containing plastic CFP until at least essentially complete removal of the polymer matrix and also the complete removal of the pyrolysis residues from the surface of the recycled carbon fibers are carried out at a defined temperature and a defined oxygen content. Subsequently, cooling is effected in a cooling zone C (corresponds to the reference numeral 19.4 in FIG. 1), so that the recycled carbon fibers RF (corresponds to the reference numeral 7 in FIG. 1) obtained in this way finally result.

Figure 6A:
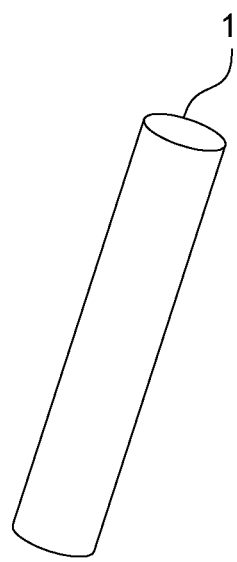
FIG. 6A schematically shows a depiction of a primary carbon fiber of the prior art having a smooth surface.

FIG. 6A schematically shows a primary carbon fiber 1 of the prior art, which has a smooth surface structure.

Figure 6B:
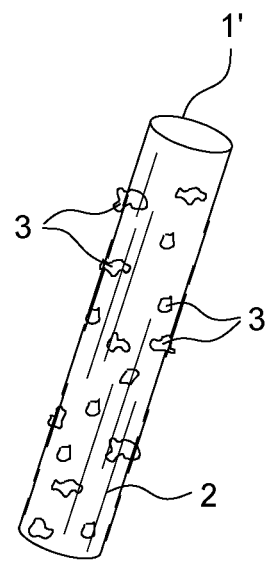
FIG. 6B schematically shows a depiction of a recycled carbon fiber of the prior art which has been obtained by a noninventive process and has pyrolysis or carbonization residues and also grooves.

FIG. 6B schematically shows a recycled carbon fiber 1' of the prior art which is obtained by a noninventive process. The surface of the recycled carbon fiber 1' has grooves 2 which are formed by oxidation of the surface of the carbon fiber during recycling. Furthermore, a significant amount of pyrolysis or carbonization residues 3 is present on the surface of the conventionally recycled carbon fiber 1'. Owing to the significant amount of pyrolysis or carbonization residues 3, the incorporability of the conventionally recycled carbon fiber 1' obtained by a noninventive process into plastics is no better, or not significantly better, than the incorporability of the primary carbon fiber 1.

Figure 6C:
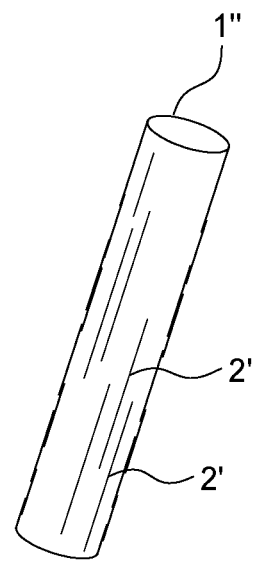
FIG. 6C schematically shows a depiction of a recycled carbon fiber which has been obtained by the process of the invention and has grooves.

FIG. 6C schematically shows a recycled carbon fiber 1" which is obtained by the process of the invention. The surface of the recycled carbon fiber has grooves 2' as a result of oxidation of the recycled carbon fiber during recycling. However, due to the process conditions according to the invention, there are no pyrolysis or carbonization residues on the surface of the recycled carbon fiber 1" according to the invention. Thus, the recycled carbon fiber 1" of the invention has significantly improved incorporability into plastics both compared to the primary carbon fiber 1 and compared to the recycled carbon fiber 1' which is not according to the invention.

The schematic depictions in FIGS. 6A, 6B and 6C correspond to microscopic analyses carried out by the applicant on the corresponding products.

One peculiarity of the present invention is, in particular, that recycled carbon fibers which surprisingly have at least essentially no pyrolysis residues and in addition, in particular owing to the partial oxidation of the surface of the carbon fibers, have better wettability compared to primary carbon fibers and to conventionally recycled carbon fibers are obtained as a result of the combination of pyrolysis plant according to the invention comprising an indirectly heated rotary tube furnace with exit openings and process conditions according to the invention, in particular an increase in the oxygen content and/or the temperature in the second pyrolysis zone.

Thus, the combination of pyrolysis plant according to the invention and process according to the invention allows selective removal of the polymer of the polymer matrix without destroying the recycled carbon fibers and consequently no significant deterioration in the mechanical properties, in particular the tensile strength and the modulus of elasticity, and electrical properties occurs, so that the materials properties of the recycled carbon fibers correspond at least essentially to those of primary carbon fibers.

Furthermore, the combination of pyrolysis plant of the invention and process of the invention results in the surface of the recycled carbon fibers being slightly oxidized, i.e. the surface is rougher and the number of oxygen-containing functional groups on the surface of the carbon fibers, e.g. phenol, carboxyl, carbonyl, aldehyde, keto, hydroxy and/or oxo groups, is significantly greater than in the case of primary carbon fibers or conventionally recycled carbon fibers.

The roughening and greater hydrophilicity of the recycled carbon fibers which results from the oxidized surface leads to improved wettability and thus to better incorporability of the recycled carbon fibers into plastics, building materials or cement-containing systems.

In a preferred embodiment of the present invention, the oxygen content G(B2) in the second pyrolysis zone B2 is increased by at least 3% by volume, in particular at least 5% by volume, preferably at least 7.5% by volume, particularly preferably by at least 10% by volume, compared to the oxygen content G(B1) in the first pyrolysis zone B1. In order to avoid oxidation of the carbon fibers in the first pyrolysis zone B1, a smaller amount of oxygen than in the second pyrolysis zone B2 in which the removal of any pyrolysis residues on the surface of the recycled carbon fibers occurs is used. The decomposition of the polymer matrix thus takes place, at least essentially in the first pyrolysis section B1, at lower oxygen contents than the removal of pyrolysis residues in the second pyrolysis zone B2. The presence of only small amounts of oxygen in the first pyrolysis zone B1 is achieved firstly by means of the input station 3, in particular in the form of an input lock, and secondly, in particular, by the atmosphere in the first pyrolysis zone B1 being essentially saturated with vapor which consists, in particular, of gaseous decomposition products occurring in the pyrolysis of the polymer matrix and which has only a small proportion of oxygen.

In this context, the oxygen content G(B2) in the second pyrolysis zone B2 is, in particular, increased by from 3% by volume to 25% by volume, in particular by from 5% by volume to 20% by volume, preferably by from 7.5% by volume to 17.5% by volume, particularly preferably by from 10% by volume to 15% by volume, compared to the oxygen content G(B1) in the first pyrolysis zone B1. As indicated above, a higher oxygen content in the second pyrolysis zone B2 than in the first pyrolysis zone B1 is set in order to at least essentially completely remove any pyrolysis residues on the surface of the recycled carbon fibers.

Particularly good results are obtained according to the present invention when the oxygen content G(B1) in the first pyrolysis zone B1 is set to values in the range from 0.1% by volume to 12% by volume, in particular in the range from 0.5% by volume to 10% by volume, preferably in the range from 0.75% by volume to 6% by volume, particularly preferably in the range from 1% by volume to 4% by volume, and the oxygen content G(B2) in the second pyrolysis zone B2 is set to values in the range from 2% by volume to 30% by volume, in particular in the range from 3% by volume to 20% by volume, preferably in the range from 5% by volume to 17% by volume, particularly preferably in the range from 6% by volume to 14% by volume, but, in particular, with the proviso that the oxygen content G(B2) in the second pyrolysis zone B2 is increased by at least 3% by volume, in particular by at least 5% by volume, preferably by at least 7.5% by volume, particularly preferably by at least 10% by volume, compared to the oxygen content G(B1) in the first pyrolysis zone B1 and/or the oxygen content G(B2) in the second pyrolysis zone B2 is increased by from 3% by volume to 25% by volume, in particular by from 5% by volume to 20% by volume, preferably by from 7.5% by volume to 17.5% by volume, particularly preferably by from 10% by volume to 15% by volume, compared to the oxygen content G(B1) in the first pyrolysis zone B1.

For the purposes of the present invention, it is possible, in particular, for the oxygen content in the first and second pyrolysis zones B1 and B2 to be controlled and/or regulated in such a way that the oxygen content G(B1) in the first pyrolysis zone B1 is set to a substoichiometric value relative to the polymer matrix to be decomposed and the oxygen content G(B2) in the second pyrolysis zone B2 is set to a superstoichiometric value relative to the carbon matrix to be decomposed. Preference is thus given according to the invention for the decomposition of the polymer matrix to be carried out in the presence of smaller amounts of oxygen in the first pyrolysis zone B1 and the removal of any pyrolysis residues being carried out in the presence of large amounts of oxygen in the second pyrolysis zone B2. In particular, the oxygen content in the first pyrolysis zone B1 is set so that it is present in an amount which is smaller than the amount of oxygen required for the combustion of the gaseous decomposition products of the polymer matrix; the small amount of oxygen in the first pyrolysis zone B2 is necessary in order to avoid oxidation of the carbon fibers and thus partial or complete destruction of the carbon fibers, which would result in significantly worsened mechanical and electrical properties. However, a higher oxygen content in the atmosphere relative to the polymer matrix to be decomposed is necessary for the complete combustion of any pyrolysis residues on the surface of the recycled carbon fibers in the second pyrolysis zone B2.

According to the invention, preference can be given to controlling and/or regulating the oxygen content during the pyrolysis, preferably during the entire process, in particular the oxygen content G(B1) in the first pyrolysis zone B1 and the oxygen content G(B2) in the second pyrolysis zone B2, preferably by taking off decomposition products originating from the decomposition of the polymer matrix, in particular gaseous decomposition products, and/or by introduction of oxygen, preferably in the form of air. According to the invention, the oxygen content in the first pyrolysis zone B1 and in the second pyrolysis zone B2 is controlled by taking off the gaseous decomposition products of the polymer matrix through the exit openings of the indirectly heated rotary tube furnace in such a way that the oxygen content in the first pyrolysis zone B1 is sufficiently high to make the decomposition and partial combustion of the polymer matrix possible but on the other hand is sufficiently low to restrict destruction of the carbon fibers by oxidation to a minimum level or avoid it entirely. Furthermore, the oxygen content in the second pyrolysis zone B2 is, according to the invention, set so that combustion of any pyrolysis residues on the surface of the recycled carbon fibers is ensured and partial oxidation of the surface of the recycled carbon fibers occurs, but without destroying the recycled carbon fibers. The setting of the oxygen content in the first pyrolysis zone B1 and the second pyrolysis zone B2 is, according to the invention, effected by taking off the gaseous decomposition products of the polymer matrix through the exit openings of the indirectly heated rotary tube furnace. Taking off the combustion gases results in a suction effect as a result of which air flows through the preferably open pyrolysis plant into the respective zone of the indirectly heated rotary tube furnace. The control and/or regulation of the oxygen content in the respective pyrolysis zone is thus very easy to carry out from a process engineering point of view and does not require use of costly gases such as oxygen.

In this context, the oxygen content during the pyrolysis, preferably during the entire process, in particular the oxygen content G(B1) in the first pyrolysis zone B1 and the oxygen content G(B2) in the second pyrolysis zone B2, can be measured by means of oxygen measurement devices, in particular oxygen-sensitive sensors and/or pressure sensors. Here, in particular, the oxygen content can be controlled and/or regulated by means of the oxygen measurement devices by taking off decomposition products originating from the decomposition of the polymer matrix, preferably by means of a gas offtake device, and/or by introduction of oxygen. For the purposes of the present invention, the oxygen content in the first pyrolysis zone B1 and in the second pyrolysis zone B2 can be measured by means of sensors and/or pressure sensors such as pitot tubes. The oxygen content determined serves, in the context of the present invention, to control the gas offtake device as a function of the oxygen content determined and the intended value of the oxygen content in the respective pyrolysis zone. Thus, the oxygen content can be increased by taking off gaseous combustion gases in the first and second pyrolysis zones through the exit openings of the indirectly heated rotary tube furnace, since taking off the gaseous decomposition products results in a suction effect and flow of air from the surroundings into the respective pyrolysis zone in the open pyrolysis plant used according to the invention. Increasing the oxygen content in the atmosphere of the respective pyrolysis zone promotes both the combustion of the polymer matrix and also combustion of any pyrolysis residues on the surface of the recycled carbon fibers. However, increased oxidation of the surface of the recycled carbon fibers also occurs.

In a preferred embodiment of the present invention, the oxygen content during the pyrolysis, preferably during the entire process, in particular the oxygen content G(B1) in the first pyrolysis zone B1 and the oxygen content G(B2) in the second pyrolysis zone B2, is controlled and/or regulated in such a way that only the polymer matrix is at least essentially selectively pyrolyzed in the first pyrolysis zone B1 and only the polymer matrix still remaining after the first pyrolysis zone B1 and the pyrolysis (coke) residues are removed at least essentially selectively and the surface of the carbon fibers which have been recycled in this way is at least partially oxidized in the second pyrolysis zone B2. Control of the oxygen content in the first and second pyrolysis zones B1 and B2 enables the polymer matrix to be pyrolyzed selectively, i.e. thermally decomposed selectively in the presence of a certain oxygen content, but without excessive oxidation on the surface of the recycled carbon fibers taking place. The reduced amount of oxygen in the first pyrolysis zone B1 does not influence the thermal decomposition of the polymer matrix, but reduced combustion of the gaseous decomposition products of the polymer of the polymer matrix and also only low oxidation of the carbon fibers takes place. In the second pyrolysis zone B2, the oxygen content is set in such a way that remaining polymer matrix and pyrolysis residues formed on the surface of the recycled carbon fibers in the first pyrolysis zone B1 are removed. Owing to the higher amount of oxygen in the second pyrolysis zone B2, at least partial oxidation of the surface of the recycled carbon fibers also takes place there, leading at the same time to improved wettability as a result of the more hydrophilic and rougher surface.

As described above, the temperature T(B2) in the second pyrolysis zone B2 can, according to the invention and in particular, be increased compared to the temperature T(B1) in the first pyrolysis zone B1.

According to the invention, the temperature T(B2) in the second pyrolysis zone B2 can, in this context, be increased by at least 25° C., in particular by at least 50° C., preferably by at least 75° C., particularly preferably by at least 100° C., even more preferably by at least 125° C., very particularly preferably by at least 150° C., compared to the temperature T(B1) in the first pyrolysis zone B1. To ensure essentially complete removal of the pyrolysis residues on the surface of the recycled carbon fibers in the second pyrolysis zone B2, a higher temperature T(B2) than in the first pyrolysis zone B1 can be selected in the second pyrolysis zone B2, since at least essentially complete removal of any pyrolysis (coke) residues on the surface of the recycled carbon fibers is ensured at elevated temperatures, in particular in combination with higher oxygen contents. However, the temperature should not exceed a particular maximum value since otherwise the recycled carbon fibers oxidize excessively and as a result the at least partial destruction of the recycled carbon fibers occurring could significantly reduce the mechanical stability of the fibers.

In particular, the temperature T(B2) in the second pyrolysis zone B2 can be increased by from 25° C. to 300° C., in particular by from 50° C. to 250° C., preferably by from 75° C. to 200° C., particularly preferably by from 100° C. to 175° C., compared to the temperature T(B1) in the first pyrolysis zone B1.

According to the invention, preference is given to setting the temperature T(B1) in the first pyrolysis zone B1 in the range from 375° C. to 475° C., in particular in the range from 390° C. to 465° C., preferably in the range from 415° C. to 455° C., particularly preferably in the range from 430° C. to 445° C., and setting the temperature T(B2) in the second pyrolysis zone B2 in the range from 450° C. to 750° C., in particular in the range from 480° C. to 690° C., preferably in the range from 510° C. to 675° C., particularly preferably in the range from 515° C. to 650° C., but, in particular, with the proviso that the temperature T(B2) in the second pyrolysis zone B2 is increased by at least 25° C., in particular by at least 50° C., preferably by at least 75° C., particularly preferably by at least 100° C., even more preferably by at least 125° C., very particularly preferably by at least 150° C., compared to the temperature T(B1) in the first pyrolysis zone B1 and/or that the temperature T(B2) in the second pyrolysis zone B2 is increased by from 25° C. to 300° C., in particular by from 50° C. to 250° C., preferably by from 75° C. to 200° C., particularly preferably by from 100° C. to 175° C., compared to the temperature T(B1) in the first pyrolysis zone B1. The first pyrolysis zone B1 serves to decompose the polymer matrix selectively and at least partially burn the resulting gaseous decomposition products by means of oxygen present in the atmosphere of the pyrolysis zone B1; owing to the small amount of oxygen in the atmosphere of the first pyrolysis zone B1, slow decomposition of the polymer matrix occurs, so that pyrolysis residues can form on the surface of the carbon fibers. These pyrolysis residues have to be removed in a second pyrolysis zone B2 at higher temperatures than in the first pyrolysis zone B1, with excessive oxidation of the recycled carbon fibers being avoided, as indicated above, by setting of a defined temperature and of a defined oxygen content.

In this context, the temperature during the pyrolysis, preferably during the entire process, in particular the temperature T(B1) in the first pyrolysis zone B1 and the temperature T(B2) in the second pyrolysis zone B2, can be controlled and/or regulated, preferably by means of temperature measurement devices, in particular temperature-sensitive sensors. The control of the temperature in the first and second pyrolysis zones B1 and B2 by means of temperature-sensitive sensors is advisable in order to ensure selective pyrolysis of the polymer matrix in the first pyrolysis zone B1 and also ensure complete removal of any pyrolysis residues on the surface of the recycled carbon fibers in the second pyrolysis zone B2. In this context, a defined control of the temperatures T(B1) and T(B2) in the first and second pyrolysis zones B1 and B2 should be ensured in order to avoid excessive oxidation and/or decomposition of the carbon fibers, which would result in a significantly reduced mechanical stability of the recycled carbon fibers.

According to the invention, preference can be given to the temperature during the pyrolysis, preferably during the entire process, in particular the temperature T(B1) in the first pyrolysis zone B1 and the temperature T(B2) in the second pyrolysis zone B2, being controlled and/or regulated in such a way that only the polymer matrix is at least essentially selectively pyrolyzed in the first pyrolysis zone B1 and only the polymer matrix still remaining after the first pyrolysis zone B1 and pyrolysis (coke) residues are at least essentially selectively removed and the surface of the carbon fibers which have been recycled in this way is at least partially oxidized in the second pyrolysis zone B2.

In an embodiment which is preferred according to the invention, the oxygen content G(B2) in the second pyrolysis zone B2 is increased compared to the oxygen content G(B1) in the first pyrolysis zone B1 and the temperature T(B2) in the second pyrolysis zone B2 is increased compared to the temperature T(B1) in the first pyrolysis zone B1. In this context, preference is given according to the present invention to the oxygen content G(B1) in the first pyrolysis zone B1 being set to values in the range from 0.1% by volume to 12% by volume, in particular in the range from 0.5% by volume to 10% by volume, preferably in the range from 0.75% by volume to 6% by volume, particularly preferably in the range from 1% by volume to 4% by volume, and the oxygen content G(B2) in the second pyrolysis zone B2 being set to values in the range from 2% by volume to 30% by volume, in particular in the range from 3% by volume to 20% by volume, preferably in the range from 5% by volume to 17% by volume, particularly preferably in the range from 6% by volume to 14% by volume, but with the proviso that the oxygen content G(B2) in the second pyrolysis zone B2 is increased by at least 3% by volume, in particular by at least 5% by volume, preferably by at least 7.5% by volume, particularly preferably by at least 10% by volume, compared to the oxygen content G(B1) in the first pyrolysis zone B1 and/or that the oxygen content G(B2) in the second pyrolysis zone B2 is increased by from 3% by volume to 25% by volume, in particular by from 5% by volume to 20% by volume, preferably by from 7.5% by volume to 17.5% by volume, particularly preferably by from 10% by volume to 15% by volume, compared to the oxygen content G(B1) in the first pyrolysis zone B1. Furthermore, preference is given according to the present invention in this context to the temperature T(B1) in the first pyrolysis zone B1 being set in the range from 375° C. to 475° C., in particular in the range from 390° C. to 465° C., preferably in the range from 415° C. to 455° C., particularly preferably in the range from 430° C. to 445° C., and the temperature T(B2) in the second pyrolysis zone B2 being set in the range from 450° C. to 750° C., in particular in the range from 480° C. to 690° C., preferably in the range from 510° C. to 675° C., particularly preferably in the range from 515° C. to 650° C., but with the proviso that the temperature T(B2) in the second pyrolysis zone B2 is increased by at least 25° C., in particular by at least 50° C., preferably by at least 75° C., particularly preferably by at least 100° C., even more preferably by at least 125° C., very particularly preferably by at least 150° C., compared to the temperature T(B1) in the first pyrolysis zone B1 and/or that the temperature T(B2) in the second pyrolysis zone B2 is increased by from 25° C. to 300° C., in particular by from 50° C. to 250° C., preferably by from 75° C. to 200° C., particularly preferably by from 100° C. to 175° C., compared to the temperature T(B1) in the first pyrolysis zone B1.

For the purposes of the present invention, it is possible, in particular, for the oxygen content G(B2) in the second pyrolysis zone B2 to be increased compared to the oxygen content G(B1) in the first pyrolysis zone B1 and the temperature T(B2) in the second pyrolysis zone B2 to be increased compared to the temperature T(B1) in the first pyrolysis zone B1. In this context, it is also possible for the oxygen content G(B1) in the first pyrolysis zone B1 to be set in the range from 0.75% by volume to 6% by volume and the oxygen content G(B2) in the second pyrolysis zone B2 to be set in the range from 6% by volume to 14% by volume, but with the proviso that the oxygen content G(B2) in the second pyrolysis zone B2 is increased by at least from 3% by volume to 13% by volume compared to the oxygen content G(B1) in the first pyrolysis zone B1. According to the invention, preference is also given in this context to the temperature T(B1) in the first pyrolysis zone B1 being set in the range from 375° C. to 475° C. and the temperature T(B2) in the second pyrolysis zone B2 being set in the range from 450° C. to 750° C., but with the proviso that the temperature T(B2) in the second pyrolysis zone B2 is increased by from 50° C. to 250° C. compared to the temperature T(B1) in the first pyrolysis zone B1.

As indicated above, the combination of the pyrolysis plant according to the invention and the process conditions according to the invention, in particular the controlled increase in the oxygen content G(B2) and/or the temperature T(B2) in the second pyrolysis zone B2 of the indirectly heated rotary tube furnace with exit openings, leads to recycled carbon fibers which at least essentially no longer have any pyrolysis residues and, owing to partial oxidation of the surface, have a more hydrophilic and rougher surface compared to primary carbon fibers or conventionally recycled carbon fibers. This leads to better wettability and incorporability of the recycled carbon fibers resulting from the process conditions according to the invention into plastics compared to primary carbon fibers or conventionally recycled carbon fibers. At the same time, the oxidation of the surface is, however, controlled in a targeted manner according to the invention so that the mechanical properties, in particular the mechanical stability, preferably the stiffness and tensile strength, of the recycled carbon fibers remain essentially unchanged compared to those of primary carbon fibers.

In general, the residence time of the object to be recycled can vary within a wide range:

In particular, the residence time VD(B1) of the object to be recycled in the first pyrolysis zone B1 is in the range from 0.1 to 60 minutes, in particular in the range from 0.5 to 30 minutes, preferably in the range from 0.75 to 15 minutes, particularly preferably in the range from 1 to 10 minutes, very particularly preferably in the range from 1 to 8 minutes. The residence time in the first pyrolysis zone B1 is, in particular, sufficient to ensure at least essentially complete removal of the polymer matrix; however, the residence time in the first pyrolysis zone B1 should not exceed a particular time in order to avoid oxidation of the carbon fibers and excessively long process times and thus uneconomical process durations. The residence time VD(B1) can, for example, be set via the transport velocity of the objects to be recycled within the first pyrolysis zone B1 and/or via the spatial length or extension of the first pyrolysis zone B1.

Furthermore, in particular, the residence time VD(B2) of the object to be recycled in the second pyrolysis zone B2 can, according to the invention, be in the range from 0.01 to 30 minutes, in particular in the range from 0.1 to 12 minutes, preferably in the range from 0.5 to 7.5 minutes, particularly preferably in the range from 1 to 6 minutes, very particularly preferably in the range from 2 to 5 minutes. It is advantageous according to the invention for the residence time in the second pyrolysis zone B2 to be controlled in such a way that, firstly, excessive oxidation of the surface of the recycled carbon fibers at elevated temperatures is avoided but, secondly, any pyrolysis residues are at least essentially removed. Since the residence times are dependent on, in particular, the temperature and/or the oxygen content, an increased residence time should be used at low temperatures and/or low oxygen contents while higher temperatures and/or higher oxygen contents result in a lower residence time. In addition, the residence time in the respective pyrolysis zones B1 and B2 is, in particular, also dependent on the dimensions or sizes and also the composition of the object to be recycled. In particular, large-volume objects or resin-impregnated objects can lead to an increased residence time in the first and/or second pyrolysis zones B1 and B2 in order to ensure, firstly, complete removal of the polymer matrix and, secondly, complete removal of any pyrolysis residues on the surface of the recycled carbon fibers. The residence time VD(B2) can, for example, be set via the transport velocity of the objects to be recycled within the second pyrolysis zone B2 and/or via the spatial length or extension of the second pyrolysis zone B2.

In this context, the ratio Q of the residence time VD(B1) of the object to be recycled in the first pyrolysis zone B1 to the residence time VD(B2) of the object to be recycled in the second pyrolysis zone B2 can, according to the invention, be at least 1.05, in particular at least 1.1, preferably at least 1.2, more preferably at least 1.3, particularly preferably at least 1.5, and/or not more than 4, in particular not more than 3.5, preferably not more than 3, more preferably not more than 2.75, particularly preferably not more than 2.5. Greater residence times in the first pyrolysis zone B1 compared to the second pyrolysis zone B2 can, in particular, be achieved by the pyrolysis zone B1 having a greater spatial length or extension than the pyrolysis zone B2 and/or by the transport velocity of the objects to be recycled in the first pyrolysis zone B1 being greater than that in the second pyrolysis zone B2.

According to the invention, the ratio Q of the residence time VD(B1) of the object to be recycled in the first pyrolysis zone B1 to the residence time VD(B2) of the object to be recycled in the second pyrolysis zone B2 can preferably satisfy the following inequality:

$1.05 \leq Q \leq 4$, in particular $1.1 \leq Q \leq 3.5$, preferably $1.2 \leq Q \leq 3$, more preferably $1.3 \leq Q \leq 2.75$, particularly preferably $1.5 \leq Q \leq 2.5$ In addition, it can be advantageous according to the invention for the residence time of the object to be recycled in the heating-up zone A to be in the range from 0.05 to 20 minutes, in particular in the range from 0.1 to 15 minutes, preferably in the range from 0.5 to 10 minutes, particularly preferably in the range from 1 to 5 minutes, very particularly preferably in the range from 1.5 to 4 minutes. In this context, it can be advantageous according to the invention for the temperature in the heating-up zone A to be in the range from 50° C. to 350° C., in particular from 100° C. to 325° C., preferably from 150° C. to 300° C., particularly preferably from 205° C. to 295° C. The use of a heating-up zone A is advantageous since the material to be recycled is preheated to a particular temperature and a uniform temperature of the object to be recycled is thus achieved very quickly in the first pyrolysis zone B1. This ensures uniform removal of the polymer matrix at relatively short residence times and thus also a constant quality of the recycled carbon fibers since nonuniform removal of the polymer matrix caused by large temperature gradients is avoided. Furthermore, the process times of the process of the invention can be significantly reduced by the use of a heating-up zone A since relatively short residence times in the first pyrolysis zone B1 are made possible by the heating of the object to be recycled to a particular temperature.

In addition, the residence time of the recycled carbon fibers in the cooling zone C can, according to the invention, be in the range from 0.1 to 30 minutes, in particular in the range from 0.5 to 25 minutes, preferably in the range from 1 to 20 minutes, particularly preferably in the range from 5 to 18 minutes, very particularly preferably in the range from 7.5 to 15 minutes. In this context, the temperature in the cooling zone C can, in particular, be in the range from 10° C. to 350° C., in particular from 20° C. to 250° C., preferably from 25° C. to 200° C., particularly preferably from 30° C. to 150° C. The cooling zone C serves to precool the recycled carbon fibers, so that rapid subsequent cooling of the recycled carbon fibers in the cooling section 16 and thus rapid further processing, in particular comminution, packaging and/or storage, is ensured. The cooling zone C can, for example, be cooled by means of air which is blown into the cooling zone C.

As regards further details of the process of the invention, the process of the invention can in principle be carried out continuously or batchwise, preferably continuously. Carrying out the process of the invention continuously allows an energy-saving and thus economic process since maintenance of a continuous temperature is more economical. Furthermore, heat fluctuations in the pyrolysis zones B1 and B2, which could have an adverse effect on the quality of the recycled carbon fibers and also on the life of the pyrolysis apparatus P, in particular of the pyrolysis furnace 1 having the indirectly heated rotary tube furnace 11, are avoided by means of a continuous process. In addition, the continuous process allows direct processing of the objects to be recycled without complicated storage of the material to be recycled.

Furthermore, it is possible, for the purposes of the present invention, for the pyrolysis apparatus P which is, in particular, arranged between the first pyrolysis zone B1 and the second pyrolysis zone B2 to have at least one further pyrolysis zone, in particular at least two further pyrolysis zones, preferably at least three further pyrolysis zones. In this context, it is also possible, according to the invention, for the pyrolysis apparatus P to have, in particular arranged between the first pyrolysis zone B1 and the second pyrolysis zone B2, from 1 to 10 further pyrolysis zones, in particular from 2 to 8 further pyrolysis zones, preferably from 3 to 7 further pyrolysis zones, preferably from 4 to 6 further pyrolysis zones.

In the context of the invention, preference is given to one or more zones of the pyrolysis apparatus P, preferably all zones of the pyrolysis apparatus, not to be physically separated and/or to go over into one another or else for one or more zones of the pyrolysis apparatus P, in particular the first pyrolysis zone B1 and the second pyrolysis zone B2, to be physically separated, in particular by means of one or more locks.

Furthermore, the object to be treated and/or to be recycled can, for the purposes of the present invention, be subjected to a pretreatment, in particular a comminution, upstream of the heating-up zone A. It can be advantageous for the object to be recycled to be subjected to comminution upstream of the heating-up zone A in order to match the maximum size of the object to be recycled to the dimensions of the opening of the input station 3 of the pyrolysis plant. In particular, the size of the object to be recycled as it is used thus depends on the dimensions of the input station 3 of the pyrolysis plant. However, it is also possible for the object to be recycled to be comminuted to a smaller size than that which would be required by the input station 3 of the pyrolysis plant used.

In this context, it is also possible for the recycled fibers resulting from the process and/or after the cooling section following the cooling zone C to be subjected to an aftertreatment, in particular a comminution, preferably by means of cutting, hacking, milling and/or chopping, and/or, in particular, contacting with at least one treatment agent, preferably selected from among sizes, dispersants, antifoams and binders and also mixtures or combinations thereof. The after-treatment, in particular comminution, of the recycled carbon fibers can be carried out in cutting apparatuses which are customary for this purpose and are known per se to those skilled in the art, with comminution in principle being able to be carried out by means of wet or dry processes. Multiple comminution, in particular multiple hacking, enables the fiber lengths of the recycled carbon fibers to be set to the desired fiber length. In this context, it is also possible for previously hacked carbon fibers to be used for producing milled recycled carbon fibers; the milled carbon fibers can be obtained by milling of the hacked carbon fibers, in particular using mills such as hammer mills, impingement plate mills, screen basket mills or the like. Furthermore, the recycled carbon fibers, in particular the surface of the recycled carbon fibers, can be treated with a treatment agent in order to match the properties of the recycled carbon fibers to the properties of the matrix and thus improve the incorporability thereof into plastics, building materials or cement-containing systems.

For further details regarding this aspect of the invention, reference may be made to what has been said above with regard to the other aspects of the invention, which applies analogously to this aspect of the invention.

The present invention also further provides, according to a fourth aspect of the present invention, recycled carbon fibers which are obtainable by the process of the invention.

The combination of pyrolysis plant according to the invention and process conditions according to the invention is reflected directly in the resulting recycled carbon fibers. Owing to the pyrolysis furnace used in the form of an indirectly heated rotary tube furnace having exit openings and also the process conditions according to the invention, in particular the partial oxidation of the surface of the pyrolytically produced recycled carbon fibers, the recycled carbon fibers resulting from the combination of pyrolysis plant according to the invention and process conditions according to the invention have essentially no pyrolysis residues and also a rougher surface, in particular grooves, flutes, furrows, depressions or the like. Furthermore, the surface of the recycled carbon fibers of the invention is more hydrophilic than the surface of primary carbon fibers or of conventionally recycled carbon fibers because of the partial oxidation. The rougher and more hydrophilic surface of the recycled carbon fibers of the invention surprisingly leads to improved wettability and thus also to improved incorporability into plastics compared to primary carbon fibers or conventionally recycled carbon fibers.

In a preferred embodiment of the present invention, the recycled carbon fibers have a wettability relative to water, determined as tensiometrically measured contact angle by the Wilhelmy method by means of single fiber measurement at $(23\pm0.5)°$ C., of not more than 75°, in particular not more than 73°, preferably not more than 70°, particularly preferably not more than 68°, even more preferably not more than 65°, very particularly preferably not more than 60°.

In this context, it is possible, in particular, for the recycled carbon fibers to have a wettability relative to water, determined as tensiometrically measured contact angle by the Wilhelmy method by means of single fiber measurement at $(23\pm0.5)°$ C., in the range from 30° to 75°, in particular from 35° to 73°, preferably from 38° to 70°, particularly preferably from 40° to 68°, even more preferably from 45° to 65°, very particularly preferably from 50° to 60°.

The determination of the wettability of the recycled carbon fibers is carried out by means of a tensiometer using the Wilhelmy method as single fiber measurement at $(23\pm0.5)°$ C. relative to water. As regards the Wilhelmy method, reference may be made, in particular, to Abe K., Onishi S., Akijama H., Takiguchi H., Tamada K., Journal of the Surface Science Society of Japan, 2000, 21, pages 643 to 650, and to Baskom W. D., The Wetting Behavior of Fibers, in: Schrader M., Loeb G. Modern Approaches to Wettability: Theory and Applications; Plenum Press, New York 1992, pages 359 to 373. In addition, reference may also be made to the following working examples of the present invention for a detailed description of the contact angle measurements by the Wilhelmy method.

For the purposes of the invention, preference is given to the recycled carbon fibers having a proportion of pyrolysis residues (carbonization residues) of less than 5% by weight, in particular less than 4% by weight, preferably less than 3% by weight, more preferably less than 2% by weight, even more preferably less than 1% by weight, particularly preferably less than 0.9% by weight, most preferably less than 0.5% by weight, based on the recycled carbon fibers.

In particular, the recycled carbon fibers can, according to the invention, have a proportion of pyrolysis residues (carbonization residues) in the range from 0.001 to 5% by weight, in particular in the range from 0.01 to 4% by weight, preferably in the range from 0.05 to 3% by weight, more preferably in the range from 0.1 to 0.95% by weight, based on the recycled carbon fibers, in particular determined gravimetrically, preferably by means of thermogravimetric analysis. A high proportion of pyrolysis residues on the surface of the recycled carbon fibers would, on the other hand, lead firstly to impaired incorporability into plastics, building materials or cement-containing systems and secondly to a significant deterioration in the electrical properties of the recycled carbon fibers. For this reason, the recycled carbon fibers have, according to the invention, an extremely small proportion of pyrolysis residues in order to obtain excellent incorporability and excellent electrical properties. The pyrolysis residues can be determined by means of gravimetric analysis, in particular by means of thermogravimetric analysis (TGA), with thermogravimetric analysis (TGA) being preferred. For a detailed description of gravimetric analysis and thermogravimetric analysis (TGA), reference can be made to the working examples according to the invention.

In addition, the recycled carbon fibers can, for the purposes of the present invention, have oxygen-containing functional groups, in particular polar and/or hydrophilic groups, in particular selected from among phenol, carboxyl, carbonyl, aldehyde, keto, hydroxy and/or oxo groups, on their surface, in particular determined by means of electron spectroscopy for chemical analysis (ESCA), preferably by means of X-ray photoelectron spectroscopy (XPS). The oxygen-containing functional groups on the surface of the recycled carbon fibers, which result from the combination of pyrolysis plant according to the invention and process conditions according to the invention, lead to a more hydrophilic surface of the recycled carbon fibers, which consequently have better wettability compared to more hydrophobic primary carbon fibers or conventionally recycled carbon fibers. The oxygen-containing functional groups on the surface of the recycled carbon fibers can, in particular, be determined by means of electron spectroscopy for chemical analysis (ESCA), preferably by means of X-ray photoelectron spectroscopy (XPS). For further information regarding the way in which ESCA and XPS measurements are carried out, reference may be made to Levsen K., Physikalische Methoden der Chemie: ESCA, Chemie in unserer Zeit, 10, 1976, pages 48 to 53, and also to the working examples according to the invention.

Furthermore, the recycled carbon fibers can have grooves, flutes, depressions, furrows, scratches, craters or the like on their surface. The combination of pyrolysis plant according to the invention and process conditions according to the invention results in recycled carbon fibers which, in contrast to primary carbon fibers, do not have a smooth surface. This is due, in particular, to the process conditions according to the invention, in particular the oxidation of the surface on the recycled carbon fibers during the removal of any pyrolysis residues. The rougher surface of the recycled carbon fibers is, apart from the presence of the hydrophilic groups, a reason for the good wettability of the recycled carbon fibers, which are obtained by means of the combination of pyrolysis plant according to the invention and process conditions according to the invention.

In general, the fiber length of the recycled carbon fibers in the uncomminuted state can vary within a wide range. In particular, the recycled carbon fibers in the uncomminuted state have a fiber length in the range from 0.01 to 5 m, in particular in the range from 0.05 to 3 m, preferably in the range from 0.1 to 2 m, more preferably in the range from 0.2 to 1 m. The dimensions of the recycled carbon fibers obtained by the process of the invention are, in particular dependent on the size of the input station 3 of the pyrolysis plant used for recycling and on any comminution steps carried out on the object to be recycled before recycling. As regards the determination of the fiber length and the fiber diameter in general, this can be carried out by means of methods which are well known per se to a person skilled in the art. In particular, the fiber length and the fiber diameter are generally determined by determination methods based on light scattering, in particular X-ray diffraction and/or laser light scattering, but also by optical microscopy, electron microscopy or the like. In addition, the determination of the fiber lengths and fiber diameters in the millimeter range can also be carried out by means of sieve analyses in accordance with DIN 66165. The abovementioned sizes relate, in particular, to an at least essentially fibrous basic structure. Furthermore, reference may be made to the information on size determination given below.

In addition, the recycled carbon fibers can have a tensile strength in the range from 1000 to 6000 MPa, in particular in the range from 1500 to 5000 MPa, preferably in the range from 2000 to 4000 MPa, more preferably in the range from 2500 to 3500 MPa. The determination of the tensile strength can, in particular, be carried out in accordance with EN ISO 527-1.

Furthermore, the recycled carbon fibers can, for the purposes of the present invention, have a modulus of elasticity in the range from 20 to 1000 GPa, in particular in the range from 50 to 800 GPa, preferably in the range from 75 to 600 GPa, more preferably in the range from 100 to 400 GPa, even more preferably in the range from 150 to 300 GPa. The modulus of elasticity can, in particular, be determined in accordance with DIN EN 61.

In addition, the recycled carbon fibers can have an average fiber diameter in the range from 0.1 to 100 µm, in particular in the range from 1 to 50 µm, preferably in the range from 2 to 25 µm, more preferably in the range from 3 to 15 µm, particularly preferably in the range from 4 to 10 µm. The determination of the average fiber diameter can be carried out, for example, by methods of determination based on optical microscopy and/or electron microscopy, as indicated above.

In an embodiment which is preferred according to the invention, the recycled carbon fibers can contain at least one treatment agent on their surface, in particular a treatment agent selected from the group consisting of (i) thermoset polymers, in particular epoxy resins; (ii) thermoplastic polymers, in particular polyolefin resins; (iii) dispersants, in particular fatty amine ethoxides and/or dialkylene glycols; (iv) antifoams, in particular polydialkylsiloxanes; and also mixtures and combinations thereof. To incorporate the recycled carbon fibers obtainable from the combination of pyrolysis plant according to the invention and process conditions according to the invention, the recycled carbon fibers can be modified, in particular on their surface, by means of at least one treatment agent in order to improve the surface properties and thus the incorporability of the recycled carbon fibers into plastics, building materials and cement-containing systems or to match the surface properties of the carbon fibers which have been recycled according to the invention to the respective matrix. The adaptation of the surface properties to the respective matrix leads to homogeneous incorporation of the recycled carbon fibers and thus to an effective improvement in or strengthening of the respective matrix.

In addition, for the purposes of the present invention, the recycled carbon fibers can be present in comminuted form, in particular in hacked and/or double hacked and/or milled form. As indicated above, the hacking of the recycled carbon fibers can be carried out in a cutting apparatus which is customary for this purpose and is known per se to a person skilled in the art, with the comminution being able in principle to be carried out by means of wet or dry methods. The fiber lengths of the recycled carbon fibers can be set appropriately by means of multiple comminution or multiple hacking. Furthermore, the milled recycled carbon fibers can be obtained from previously hacked recycled carbon fibers, for example using mills such as hammer mills, impingement plate mills or screen basket mills or the like.

In this context, the comminuted recycled carbon fibers can also have an average fiber length in the range from 0.01 to 200 mm, in particular in the range from 0.1 to 150 mm, preferably in the range from 0.2 to 100 mm, more preferably in the range from 0.5 to 90 mm, particularly preferably in the range from 1 to 80 mm, very particularly preferably in the range from 2 to 70 mm. The determination of the fiber length can, in particular, be carried out by the measurement methods indicated above. Furthermore, the abovementioned fiber length relates to singly comminuted recycled carbon fibers which have a greater fiber length than multiply comminuted recycled carbon fibers. However, this is self-evident to a person skilled in the art.

In addition, the comminuted recycled carbon fibers can have an average fiber length in the range from 0.1 to 70 mm, in particular in the range from 0.5 to 60 mm, preferably in the range from 1 to 50 mm, more preferably in the range from 2 to 40 mm, particularly preferably in the range from 3 to 30 mm, very particularly preferably in the range from 5 to 20 mm. The average fiber length of the recycled carbon fibers can be determined as indicated above. In this context, the abovementioned fiber length relates to doubly comminuted recycled carbon fibers which have a shorter fiber length than singly comminuted recycled carbon fibers.

Furthermore, the comminuted recycled carbon fibers can have an average fiber length in the range from 0.1 to 1000 µm, in particular in the range from 1 to 900 µm, preferably in the range from 5 to 700 µm, more preferably in the range from 10 to 500 µm, particularly preferably in the range from 25 to 400 µm, very particularly preferably in the range from 50 to 350 µm, even more preferably in the range from 75 to 250 µm. The determination of the average fiber length of the abovementioned recycled carbon fibers can be carried out by means of the methods of determination indicated above. In this context, the abovementioned average fiber length of the recycled carbon fibers relates to milled recycled carbon fibers.

Furthermore, as regards the comminuted recycled carbon fibers, the comminuted recycled carbon fibers can have a fiber density in the range from 200 to 5000 kg/m$^3$, in particular in the range from 300 to 4500 kg/m$^3$, preferably in the range from 500 to 4000 kg/m$^3$, more preferably in the range from 700 to 3500 kg/m$^3$, particularly preferably in the range from 1000 to 3000 kg/m$^3$, very particularly preferably in the range from 1200 to 2500 kg/m$^3$, even more preferably in the range from 1500 to 2200 kg/m$^3$. The determination of the fiber density of the recycled carbon fibers can be carried out, in particular, in accordance with DIN 29971.

For further information on this aspect of the invention, reference can be made to what has been said above with regard to the other aspects of the invention, which applies analogously to this aspect of the invention.

Furthermore, the present invention also provides, according to a fifth aspect of the present invention, for the use of recycled carbon fibers according to the invention as additive, in particular as additive for plastics, building materials or cement-containing systems or for producing carbon fiber-containing plastics or for incorporation into plastics, in particular for compounding, or for producing carbon fiber-containing shaped bodies (e.g. components), molds and sheet-like materials (e.g. nonwovens).

For the purposes of the present invention, thermoplastic polymers, thermoplastic polymer mixtures and thermoset polymers can preferably be used. In particular, the plastic (polymer) can be selected from the group consisting of polycarbonate resins, polyamide resins, saturated polyester resins, polyurethane resins, polyacetal resins, polysulfone resins, polyether sulfone resins (PES), polyphenylene sulfide resins (PPS), polystyrene resins (PS), polyolefin resins, polyvinyl chloride resins, polyether ether ketone resins (PEEK), polyether imide resins (PEI), polyarylene oxide resins, polyamidimide resins, polyacrylate resins, polyimide resins and also mixtures and combinations thereof.

In this context, the recycled carbon fibers of the invention can, in particular, be provided for compounding, in particular for incorporation into plastics. In particular, incorporation of the recycled carbon fibers of the invention results in an upgrading of the plastics and/or, in particular, an improvement in the mechanical properties.

For further information on this aspect of the invention, reference may be made to what has been said above with regard to the other aspects of the invention, which applies analogously to this aspect of the invention.

In addition, the present invention also provides, according to a sixth aspect of the present invention, plastics, building materials or cement-containing systems which comprise recycled carbon fibers according to the present invention, as have been described in detail above, or have been produced using recycled carbon fibers obtainable by the process of the invention, as have been described in detail above. For further information on this aspect of the invention, reference can be made to what has been said above with regard to the other aspects of the invention, which applies analogously to this aspect of the invention.

Finally, the present invention further provides, according to a seventh aspect of the present invention, shaped bodies (e.g. components), molds and sheet-like materials (e.g. nonwovens), in particular in the form of composite materials or compounds which comprise recycled carbon fibers according to the present invention, as have been described in detail above, or which have been produced using recycled carbon fibers obtainable by the process of the invention, as have been described in detail above. For further information on this aspect of the invention, reference can be made to what has been said above with regard to the other aspects of the invention, which applies analogously to this aspect of the invention.

As indicated above, the present invention is associated with many advantages and peculiarities, among which some aspects will be presented below, without implying a restriction:

The use of the pyrolysis plant of the invention, which comprises an indirectly heated rotary tube furnace with exit openings, allows uniform mixing, circulation and heating of the CFP material in the pyrolysis furnace with simultaneous discharge of the pyrolysis gases. This results in optimal pyrolysis conditions and thus in selective removal of the polymer matrix at any desired place in the rotary tube furnace, so that essentially no pyrolysis (coke) residues remain on the surface of the recycled carbon fibers after the complete removal of the polymer matrix.

Furthermore, the exit openings of the indirectly heated rotary tube furnace of the pyrolysis plant of the invention make it possible to control the atmosphere, in particular the oxygen content, within the rotary tube furnace. In combination with the indirect heating of the rotary tube furnace, by means of which temperature fluctuations are avoided, selective and essentially complete removal of the polymer matrix is possible without the recycled carbon fibers being damaged to an excessive extent, in particular excessively strongly oxidized, since this would result in significantly reduced mechanical and electrical properties of the recycled carbon fibers.

The combination of uniform heating and mixing of the CFP material with the targeted control of the oxygen content and/or the temperature, which is made possible by use of the pyrolysis plant of the invention and the process conditions according to the invention, leads to recycled carbon fibers which have at least essentially no pyrolysis or carbonization residues on their surface. Furthermore, the above combination results in partial oxidation of the surface of the recycled carbon fibers, i.e. in a rougher surface which displays more bonding affinity, in particular hydrophilic surface, and in an increase in oxygen-containing groups at the surface of the resulting recycled carbon fibers, e.g. hydroxy, aldehyde, carboxyl groups, etc. The partial oxidation of the surface of the recycled carbon fibers resulting from the combination of pyrolysis plant according to the invention and process conditions according to the invention leads, owing to the rougher and functionalized, in particular more hydrophilic, surface of the recycled carbon fibers, to increased wettability and thus also to improved incorporability into plastics compared to primary carbon fibers or conventionally recycled carbon fibers.

In addition, the combination of the pyrolysis plant of the invention and the process conditions according to the invention, in particular the control of the temperature and of the oxygen content, during the entire pyrolysis avoids excessive oxidation of the recycled carbon fibers, so that the recycled carbon fibers of the invention have comparable mechanical properties to primary carbon fibers.

In addition, owing to the strongly exothermic reaction of oxygen with the gaseous decomposition products of the polymer matrix, significantly less heat energy is required for carrying out the process of the invention, so that the process of the invention is extremely economical. Furthermore, the respective temperatures necessary for the pyrolysis can also be reached very quickly because of the strongly exothermic reaction, so that short residence times of the objects to be recycled result according to the process of the invention. Consequently, large amounts of carbon fiber-containing plastics can be recycled in a short time by means of the pyrolysis plant of the invention in combination with the process of the invention.

Before carrying out the process of the invention in the pyrolysis plant of the invention, it is not necessary to carry out any mechanical and/or chemical pretreatment of the carbon fiber-containing plastics to be recycled, so that recycled carbon fibers having a long fiber length, from which, after addition of a resin, prepregs can, for example, be produced, are obtained. However, the recycled carbon fibers having a long fiber length can also be comminuted to defined fiber lengths as are used, for example, in compounding.

It is also possible to recycle laminar strips of carbon fiber-containing plastics and other reinforcing materials such as glass fibers without complicated separation in the process of the invention since the process of the invention results in individual strip layers of recycled carbon fibers from which other reinforcing materials can easily be removed.

In addition, the process of the invention which is carried out in the pyrolysis plant of the invention allows continuous operation and implementation on an industrial scale, too.

Further embodiments, modifications and variations of the present invention can readily be recognized and realized by a person skilled in the art on reading the description, without going outside the scope of the present invention.

The present invention is illustrated with the aid of the following working examples, but these do not restrict the present invention.

WORKING EXAMPLES

The particular advantages of the invention are described below for the example of the recovery (recycling) of carbon fibers from carbon fiber-containing materials.

A) Process for Recycling Carbon Fiber-Containing Plastics

Carbon fiber-reinforced plastic scrap (CFP scrap) as is obtained, for example, in aircraft construction (e.g. aircraft airfoils) or from wind power turbines (e.g. wind blades) is used as carbon fiber-containing plastics. If the pieces of CFP scrap have dimensions larger than the opening of the input station of the pyrolysis plant, comminution of the CFP scrap is carried out by means of cutting apparatuses which are known per se to those skilled in the art before recycling.

The recycling of carbon fibers from the above-described carbon fiber-containing scrap in the form of prepregs is carried out in the pyrolysis plants indicated in table 1.

TABLE 1 pyrolysis plants used for recycling

| No. | pyrolysis plant |
|---|---|
| 1* | pyrolysis plant having an indirectly heated rotary tube furnace having exit openings and one section or one treatment zone (cf. FIG. 1) |
| 2* | pyrolysis plant having an indirectly heated rotary tube furnace having exit openings and two sections or two treatment zones (cf. FIG. 1 and 5) |
| 3 | pyrolysis plant having an indirectly heated rotary tube furnace without exit openings and one section or one treatment zone |
| 4 | pyrolysis plant having an indirectly heated rotary tube furnace without exit openings and two sections or treatment zones |
| 5 | pyrolysis plant having a belt furnace having one treatment zone or one section |

*according to the invention

The recycling of carbon fiber-containing plastics is carried out in the above-described pyrolysis plants, with the process conditions described in table 2 being set in each case in the respective pyrolysis plant.

TABLE 2

Process conditions

| No. | Process conditions | |
|---|---|---|
| 1* | Temperature: | 500° C. |
| | Oxygen content: | 2-10% by volume |
| | Residence time: | 60 min |
| 2* | Heating-up zone A: | 205-295° C. |
| | Temperature of pyrolysis zone B1: | 430-445° C. |
| | Temperature of pyrolysis zone B2: | 515-650° C. |
| | Oxygen content in pyrolysis zone B1: | 2% by volume |
| | Oxygen content in pyrolysis zone B2: | 10% by volume |
| | Residence time in pyrolysis zone B1: | 26 min |
| | Residence time in pyrolysis zone B2: | 24 min |
| | Cooling zone C: | 80-150° C. |
| 3 | Temperature: | 500° C. |
| | Oxygen content: | 2% by volume |
| | Residence time: | 60 min |
| 4 | Heating-up zone A: | 205-295° C. |
| | Temperature in pyrolysis zone B1: | 430-445° C. |
| | Temperature in pyrolysis zone B2: | 515-650° C. |
| | Oxygen content in pyrolysis zone B1: | 2% by volume |
| | Oxygen content in pyrolysis zone B2: | 5% by volume |
| | Residence time in pyrolysis zone B1: | 26 min |
| | Residence time in pyrolysis zone B2: | 24 min |
| | Cooling zone C: | 80-150° C. |
| 5 | Temperature: | 500° C. |
| | Oxygen content: | 2-10% by volume |
| | Residence time: | 60 min |

*according to the invention

The surface structure, the proportion of pyrolysis residues and the oxygen-containing groups on the surface of the recycled carbon fibers obtained by recycling in various pyrolysis plants are determined by means of the measurement methods described below.

B) Measurement Methods and Results a) Optical Microscopic Examinations of the Recycled Carbon Fibers The nature of the surface and the presence of pyrolysis residues is examined by means of scanning electron microscopy (SEM). Suitable scanning electron microscopes are well known to those skilled in the art. In this context, it is possible to use, for example, scanning electron microscopes of the model JEOL 6400 F or Hitachi S-3200. The resolution of the scanning electron microscopic data is determined by the resolution of the scanning electron microscope. The results for the various pyrolysis plants obtained by means of scanning electron microscopy are shown in table 3 below.

TABLE 3

Results of the scanning electron microscopic examination

| No. | No. | Result of scanning electron microscopic examinations |
|---|---|---|
| 1* | | Rough surface in the form of grooves and depressions, no visible damage to the fiber surface, no pyrolysis residues on the fiber surface, polymer matrix completely removed |
| 2* | | Rough surface in the form of grooves and depressions, no visible damage to the fiber surface, no pyrolysis residues on the fiber surface, polymer matrix completely removed |
| 3 | | Barely any grooves or depressions in the surface, some damage to the carbon fibers, many pyrolysis residues on the fiber surface |
| 4 | | Barely any grooves or depressions in the surface, damage to the carbon fibers, many pyrolysis residues on the fiber surface |
| 5 | | Rough surface in the form of grooves and depressions, no damage to the carbon fibers, pyrolysis residues on the fiber surface |

*according to the invention

It has surprisingly been found that only when using the pyrolysis plant of the invention having an indirectly heated rotary tube furnace having exit openings in combination with the process conditions according to the invention are recycled carbon fibers which have no significant damage to the fiber surface but, as a result of oxidation during recycling, have a rough surface in the form of grooves and depressions obtained. Furthermore, the recycled carbon fibers have no pyrolysis residues when using the pyrolysis plants of the invention in combination with the process conditions according to the invention (cf. Sample No. 1 and 2), so that neither the incorporability nor the mechanical properties, in particular the stiffness and the elongation, nor the electrical properties are significantly influenced by recycling (cf. Sample No. 2). In particular, the recycled carbon fibers have, when process conditions according to the invention are employed (cf. Sample No. 2), a virtually identical stiffness and an elongation which is only from about 5% to 10% lower compared to primary carbon fibers. The use of a pyrolysis plant which comprises an indirectly heated rotary tube furnace without exit openings results in recycled carbon fibers which have a significant amount of pyrolysis residues (cf. Sample No. 3); this is attributable, in particular, to the low oxygen content since the pyrolysis gas cannot escape from the rotary tube during the pyrolysis because of the lack of exit openings. The use of a pyrolysis plant which comprises an indirectly heated rotary tube without exit openings but with two treatment zones also results in recycled carbon fibers which have a significant amount of pyrolysis residues (cf. Sample No. 4). The presence of large amounts of pyrolysis gas directly at the recycled carbon fibers prevents a high oxygen concentration at the surface of the recycled carbon fibers, but this is necessary for removal of the pyrolysis residues and the partial oxidation of the surface of the recycled carbon fibers. Furthermore, combustion of the pyrolysis gases takes place at relatively large amounts of oxygen, and this leads to a local temperature increase as a result of the strongly exothermic reaction and thus damages the recycled carbon fibers. The use of a pyrolysis plant having a belt furnace results in recycled carbon fibers which have a significant amount of pyrolysis residues (cf. Sample No. 5) because of the temperature which is too low in combination with the absence of mixing during the pyrolysis.

b) Contact Angle Measurement by Means of the Wilhelmy Method

The contact angle measurements on recycled carbon fibers obtained using the various pyrolysis plants are determined by means of a tensiometer, e.g. a K100SF tensiometer from KRÜSS GmbH, Hamburg, Germany. The contact angle measurements are carried out as individual fiber measurements relative to water.

For this purpose, the respective recycled carbon fibers are firstly comminuted to a length of from 0.8 to 1 cm. The comminution of the respective recycled carbon fibers can, for example, be effected by hacking in a cutting apparatus which is customary for this purpose and is known per se to those skilled in the art, with the comminution being able in principle to be carried out by means of wet or dry methods.

The comminuted recycled carbon fibers are fixed with the aid of a sample holder to the force sensor (weighing system) of the tensiometer, the test liquid, in the present case water, is introduced into a measurement vessel (glass, diameter 70 mm, volume about 70 ml) and positioned in a temperature controlled unit of the tensiometer under the force sensor.

The wetted length of the respective individual fibers relative to n-heptane is firstly determined. The parameters of the n-heptane test liquid and of the water required for the measurement are shown in the following table.

TABLE 4

Parameters of the test liquids

| Test liquid | σ [mN/m] | ρ [g/cm$^3$] |
|---|---|---|
| n-Heptane | 20.4 | 0.684 |
| Water | 72.80 | 0.998 |

The measurement of the contact angles and of the wetted length is carried out at a temperature of (23° C.±0.5)° C., with the determination of the dynamic contact angle being progressive angle. A double determination is carried out for each recycled carbon fiber.

The detection speed is 6 mm/min, the measurement speed is 1 mm/min, the sensitivity is 0.0004 mg and the depth to which the fibers dip in (position) is 5 mm.

The contact angle is automatically determined or calculated from the force changes at the recycled carbon fiber in contact with water registered at the force sensor and as a function of the position, the surface tension of the water and the previously determined wetted length of the recycled carbon fiber by means of software (e.g. Labdesk Software from KRÜSS GmbH, Hamburg, Germany), with in the present case the determination being carried out as on-line contact angle.

The wetted length of the recycled carbon fibers and the contact angles are shown in table 5 below.

TABLE 5

Wetted length and contact angle of the recycled carbon fibers

| No. | Wetted length [mm] | Contact angle [°] |
|---|---|---|
| 1* | 0.025 ± 0.000 | 69.26 ± 0.22 |
| 2* | 0.025 ± 0.001 | 66.35 ± 0.11 |
| 3 | 0.023 ± 0.001 | 83.45 ± 0.04 |
| 5 | 0.025 ± 0.001 | 76.16 ± 0.82 |

*according to the invention

The contact angle for Sample No. 4 could not be determined because of the partial destruction of the recycled carbon fibers. Furthermore, it was surprisingly found that oxidation of the surface takes place when recycling is carried out using the pyrolysis plant of the invention in combination with the process conditions according to the invention, so that a hydrophilic surface results (Samples No. 1 and 2). This is made clear by the lower contact angle compared to Sample No. 3, which owing to the lower oxygen content during the pyrolysis does not have a hydrophilic surface. Sample No. 5, too, has a hydrophilic surface, but significant amounts of pyrolysis residues are found on the surface of the recycled carbon fibers by scanning electron microscopy because of the use of a belt furnace, as indicated above.

Overall, it has surprisingly been found that only when the pyrolysis plant of the invention is used in combination with the process conditions according to the invention does oxidation of the surface of the recycled carbon fibers take place, but without damaging these significantly so that the mechanical properties of the recycled carbon fibers of the invention are retained. The more hydrophilic surface results in better incorporability into plastics, building materials or cement-containing systems compared to primary carbon fibers which have a contact angle above 75° C. (i.e. are more difficult to wet).

c) Gravimetric and Thermogravimetric Analysis (TGA)

The gravimetric determination of the pyrolysis residue can be carried out by suspending a precisely determined amount of the respective recycled carbon fibers in a solvent such as dichloromethane, subsequently treating the suspension in an ultrasonic bath, filtering the suspension through a coarse sieve which holds back only the carbon fibers and reweighing the dried recycled carbon fibers. The proportion of pyrolysis residues is given by the difference between the weight of the recycled carbon fibers before and after the treatment with the solvent such as dichloromethane.

However, in the present case the proportion of pyrolysis residues was determined by means of thermogravimetric analysis (TGA). The thermogravimetric analysis (TGA) can be carried out using measurement apparatuses which are known per se to a person skilled in the art. In the present case, the recycled carbon fibers obtained by use of various pyrolysis plants were firstly finely comminuted, with comminution being able to be carried out using comminution methods known per se to a person skilled in the art, in particular using cutting apparatuses or mills such as hammer mills, impingement plate mills, screen basket mills. After comminution of the respective sample, 1 mg of the comminuted recycled carbon fibers obtained using the various pyrolysis plants is transferred into the measurement apparatus and the thermogravimetric analysis is carried out using the following parameters: the air flow velocity is 20 $cm^3$/s, the heating up rate of the temperature is 10° C./min and the recording speed is 1/s. The residues which vaporize up to about 550° C., which are the pyrolysis residues, are determined by weighing the sample before and after the thermogravimetric analysis. The determination can be carried out, for example, by means of a microbalance.

In the case of Samples No. 1 and 2, no weight losses were found, so that the pyrolysis plant of the invention in combination with the process conditions according to the invention does not result in significant amounts of pyrolysis residues. In particular, the recycled carbon fibers produced using the pyrolysis plant of the invention and the process conditions according to the invention have pyrolysis residues of less than 0.1% by weight (i.e. below the detection limit). The Samples No. 3 to 5 which are not according to the invention each have significant amounts of pyrolysis residues of in each case more than 5% by weight, which is why they have poorer incorporability into plastics. In addition, the high proportion of pyrolysis residues in Samples No. 3 to 5 has an adverse effect on the electrical properties of the recycled carbon fibers.

d) X-Ray Photoelectron Spectroscopy (XPS)

Finally, the type and amount of the oxygen containing groups on the surface of the recycled carbon fibers produced by use of various pyrolysis plants were determined by means of X-ray photoelectron spectroscopy (XPS).

The respective recycled carbon fibers are applied in bundles to a spacer which is made of stainless steel and has a diameter of 1 cm and is provided with double-sided adhesive tape. The ends of the bundle of recycled carbon fibers are subsequently fixed to the spacer by use of a further adhesive tape. All six samples are placed at a distance of about 5 mm from one another on this spacer.

The X-ray photoelectron spectroscopy can be carried out using measurement instruments suitable for this purpose, for example a Kratos AXIS ULTRA, using a monochromatic Al-Kα X-ray electron source (1486.6 eV) at an emission current of 15 mA and an anode potential of 10 kV. The spectra are recorded in the range from 0 to 1100 eV, with the transmission energy being 80 eV and the step size being set to 0.5 eV. All spectra are recorded using a 90° angle of reflection. In each case, three positions in the middle of the sample are measured, with the surface area of the sample being 300 µm×700 µm in each case.

The composition of the surface is calculated by means of software such as CasaXPS.

As surprisingly established by the applicant, the carbon fibers of Samples No. 1 and 2 which have been recycled according to the invention have higher concentrations of keto and carboxylate groups on the surface than the Samples No. 3 and 4 which are not according to the invention. Sample No. 5 likewise has a higher proportion of keto and carboxylate groups than the recycled carbon fibers of Samples No. 3 and 4 which are not according to the invention, but significant amounts of pyrolysis residues are to be found on the surface of the recycled carbon fibers of Sample No. 5 because of the pyrolysis plant used in combination with the process conditions used, and these pyrolysis residues make incorporation into plastics more difficult and have an adverse effect on the electrical properties of the recycled carbon fibers.

The increased proportion of oxygen-containing groups, in particular keto and carboxylate groups, leads to a more hydrophilic surface of the recycled carbon fibers of the invention. This more hydrophilic surface leads to better incorporability because of the better wettability of the surface.

| List of reference symbols: | |
|---|---|
| 1 | pyrolysis furnace |
| 2 | CFP material |
| 3 | Input station |
| 4 | Chute |
| 5 | Conveyor belt |
| 6 | Output station |
| 7 | Carbon fiber material |
| 8 | Gas offtake device |
| 9 | pyrolysis gas |
| 10 | Control unit |
| 11 | Rotary tube |
| 12 | Exit openings |
| 13 | Housing |
| 14 | Discharge line |
| 15 | Heating section |
| 16 | Cooling section |
| 17 | Spray nozzles |
| 18 | Collection pan |
| 19 | Sections |
| 19.1 | Heating-up zone A |
| 19.2 | First pyrolysis zone B1 |
| 19.3 | Second pyrolysis zone B2 |
| 19.4 | Cooling zone C |
| 20 | Air inlet |
| 21 | Control valve |
| 22 | Mixing elements |
| 23 | Gas burner |
| 24 | Heating gas lines |
| 25 | Connection |
| 26 | Transport element |
| P | pyrolysis apparatus |
| A | Heating-up zone |
| B1 | First pyrolysis zone |
| B2 | Second pyrolysis zone |
| C | Cooling zone |
| CFP | Carbon fiber-containing plastic |
| RF | Recycled carbon fibers |
| 1 | Primary carbon fiber (not according to the invention) |
| 1' | Recycled carbon fiber (not according to the invention) |
| 1" | Recycled carbon fiber (according to the invention) |
| 2 | Grooves on a recycled carbon fiber 1' (not according to the invention) |
| 2' | Grooves on a recycled carbon fiber 1" (according to the invention) |
| 3 | pyrolysis or carbonization residue |

The invention claimed is:

1. A pyrolysis plant for recovering carbon fibers from carbon fiber-containing plastics (CFP material),
wherein the pyrolysis plant comprises:
an elongated pyrolysis furnace for the continuous pyrolysis of CFP material which operates continuously during operation,
an input station for introducing CFP material to be processed into the pyrolysis furnace at its one end,
an output station for discharging recovered carbon fiber material from the pyrolysis furnace at its other end,
a gas offtake device for pyrolysis gas produced in the pyrolysis furnace, and
a control device for regulating at least individual constituents of the gas in the pyrolysis furnace;
wherein the pyrolysis furnace is an indirectly heated rotary tube furnace which has at least the following constituents:
an elongated rotary tube which forms the accommodation space for the CFP material to be processed and is connected to the input station and the output station, with the rotary tube being provided on its cylindrical wall with exit openings configured for discharging pyrolysis gas formed during the pyrolysis over at least part of its length, and
a housing which is insulated from the outside and at least partly surrounds the rotary tube and has openings for the input station and optionally also for the output station and has discharge lines for the pyrolysis gas, where a plurality of sections having different or differently regulatable gas temperatures are provided in the housing along the length of the rotary tube;
wherein the exit openings in the rotary tube are provided at least in the section configured to have the highest gas temperature;
wherein the pyrolysis furnace has various sections, regulated by the control device, wherein, in the operating state, the various sections are regulated via the control device such as to comprise at least one heating-up zone, a first pyrolysis zone, a second pyrolysis zone and a cooling zone, and wherein, in the operating state, the control device regulates the composition of the gas and the temperature in the pyrolysis furnace in the various sections of the rotary tube can be regulated differently, namely with a defined proportion of oxygen and with a defined temperature in the first pyrolysis zone and with a defined proportion of oxygen and with a defined temperature in the second pyrolysis zone; and
wherein the pyrolysis plant additionally comprises a comminution apparatus for comminuting CFP material to be processed, with the comminution apparatus being arranged before or upstream of the input station.

2. The pyrolysis plant as claimed in claim 1,
wherein the rotary tube comprises a first heating section extending from the input station and a second, adjoining cooling section leading to the output station.

3. The pyrolysis plant as claimed in claim 2,
wherein the rotary tube is configured so as to be coolable by means of water in the cooling section.

4. The pyrolysis plant as claimed in claim 2, wherein the rotary tube does not comprise any exit openings in the cooling section.

5. The pyrolysis plant as claimed in claim 1,
wherein the exit openings are distributed essentially uniformly over the circumference of the rotary tube.

6. The pyrolysis plant as claimed in claim 1, wherein the size of the exit openings is configured to be adjustable in order to maintain CFP material and carbon fibers within the rotary tube.

7. The pyrolysis plant as claimed in claim 1,
wherein the rotary tube is arranged so as to be inclined downward from the input station to the output station.

8. The pyrolysis plant as claimed in claim 1, wherein the rotary tube is provided in its interior with mixing elements.

9. The pyrolysis plant as claimed in claim 1, wherein the rotary tube is provided firstly with mixing elements and secondly with a transport element.

10. The pyrolysis plant as claimed in claim 1, wherein the input station is configured as an input lock.

11. The pyrolysis plant as claimed in claim 1,
wherein the comminution device is configured in the form of at least one of a shredder, hacking, chopping, milling, tearing and cutting device.

12. The pyrolysis plant as claimed in claim 1,
wherein the pyrolysis plant additionally comprises, arranged after the output station, a work-up device for working up the recycled carbon fibers obtained from the CFP material.

13. The pyrolysis plant as claimed in claim 1,
wherein the pyrolysis plant additionally comprises a work-up device arranged after or downstream of the output station in the process direction for working up the recycled carbon fibers obtained from the CFP material.

14. The pyrolysis plant as claimed in claim 1,
wherein heating of the pyrolysis furnace is effected from at least one external gas burner via heating gas lines in the housing.

15. A process for recovering carbon fibers from carbon fiber-containing plastics, carbon fiber-reinforced plastics, carbon fiber-containing composites and carbon fiber-reinforced composites,
wherein the process comprises utilizing the pyrolysis plant as claimed in claim 1 to carry out the steps of introducing CFP material into the input station and sequentially passing the CFP material through the heating-up-zone, the first pyrolysis zone, the second pyrolysis zone, the cooling zone and discharging carbon fibers from the output station.

16. A process for recovering carbon fibers from carbon fiber-containing plastics,
wherein the process comprises the following steps:

an object based on a carbon fiber-containing plastic which comprises carbon fibers in a polymer matrix is subjected to a multistage pyrolysis in the presence of oxygen, with the polymer of the polymer matrix being decomposed during the pyrolysis to give the carbon fibers, and the pyrolysis is carried out in a pyrolysis plant as claimed in claim 1 and comprising a pyrolysis furnace, where the pyrolysis furnace comprises at least the following treatment zones in the order specified below and the object goes through the following treatment zones in this order:

(A) a heating-up zone A in which the object to be treated and to be recycled is heated to a defined temperature, (B1) subsequently, a first pyrolysis zone B1 in which a pyrolysis of the polymer of the polymer matrix of the object to be treated is carried out at a defined temperature T(B1) and a defined oxygen content G(B1), (B2) subsequently, a second pyrolysis zone B2 in which a final pyrolysis of the polymer of the polymer matrix of the object to be treated still present after the pyrolysis zone B1 is carried out at a defined temperature T(B2) and a defined oxygen content G(B2) to at least essentially complete removal, (C) subsequently, a cooling zone C for cooling the recycled carbon fibers obtained from the second pyrolysis zone B2;

wherein the oxygen content G(B2) in the second pyrolysis zone B2 is increased by from 3% by volume to 25% by volume compared to the oxygen content G(B1) in the first pyrolysis zone B1 and wherein the temperature T(B2) in the second pyrolysis zone B2 is increased by from 25° C. to 300° C. compared to the temperature T(B1) in the first pyrolysis zone B1.

* * * * *